(12) United States Patent
Kiyono et al.

(10) Patent No.: US 7,001,655 B2
(45) Date of Patent: Feb. 21, 2006

(54) OPTICAL RECORDING MEDIUM

(75) Inventors: Kenjirou Kiyono, Tokyo (JP); Jun Kanehira, Tokyo (JP); Akio Okamuro, Tokyo (JP)

(73) Assignees: Mitsubishi Chemical Corporation, Tokyo (JP); Mitsubishi Kagaku Media Co., Ltd., Tokyo (JP)

( * ) Notice: Subject to any disclaimer, the term of this patent is extended or adjusted under 35 U.S.C. 154(b) by 0 days.

(21) Appl. No.: 11/000,477

(22) Filed: Dec. 1, 2004

(65) Prior Publication Data

US 2005/0079444 A1   Apr. 14, 2005

Related U.S. Application Data

(63) Continuation of application No. PCT/JP03/12657, filed on Oct. 2, 2003.

(30) Foreign Application Priority Data

Oct. 2, 2002 (JP) .............................. 2002-289643
Apr. 24, 2003 (JP) .............................. 2003-120125

(51) Int. Cl.
   *B32B 3/02* (2006.01)
(52) U.S. Cl. ............... 428/64.1; 428/64.4; 428/64.5; 428/64.6; 430/270.13
(58) Field of Classification Search ........... 430/270.13, 430/495.1, 945; 428/64.1, 64.4, 64.5, 64.6, 428/913
   See application file for complete search history.

(56) References Cited

U.S. PATENT DOCUMENTS

| | | | |
|---|---|---|---|
| 5,194,363 A | 3/1993 | Yoshioka et al. | |
| 5,230,973 A | 7/1993 | Yoshioka et al. | |
| RE36,383 E | 11/1999 | Yoshioka et al. | |
| 6,153,063 A * | 11/2000 | Yamada et al. | 204/192.22 |
| 6,268,034 B1 * | 7/2001 | Kitaura et al. | 428/64.1 |
| 6,353,592 B1 | 3/2002 | Kashiwagi et al. | |
| 6,383,595 B1 | 5/2002 | Hirotsune et al. | |
| 6,503,690 B1 * | 1/2003 | Uno et al. | 430/270.13 |
| 6,636,477 B1 | 10/2003 | Miyamoto et al. | |
| 6,703,098 B1 * | 3/2004 | Hirotsune et al. | 428/64.1 |
| 2004/0042381 A1 | 3/2004 | Miyamoto et al. | |
| 2004/0264357 A1 * | 12/2004 | Ikari et al. | 369/275.2 |

FOREIGN PATENT DOCUMENTS

| | | |
|---|---|---|
| JP | 2-123533 A | 5/1990 |
| JP | A 4-52188 | 2/1992 |
| JP | A 4-52189 | 2/1992 |
| JP | A 4-143937 | 5/1992 |
| JP | 5-217211 A | 8/1993 |

(Continued)

*Primary Examiner*—Elizabeth Mulvaney
(74) *Attorney, Agent, or Firm*—Oblon, Spivak, McClelland, Maier & Neustadt, P.C.

(57) ABSTRACT

An optical recording medium simultaneously having higher recording characteristics and storage stability than ever, is obtained.

An optical recording medium comprising at least a phase change recording layer, a first diffusion preventing layer, a second diffusion preventing layer and a protective layer formed in this order on a substrate, characterized in that the first diffusion preventing layer and the second diffusion preventing layer comprise a non-gas element and nitrogen and/or oxygen as the main components, the non-gas element in each of the first diffusion preventing layer and the second diffusion preventing layer, is the same, and the content (atomic %) of nitrogen and/or oxygen contained in the second diffusion preventing layer, is larger than the content (atomic %) of nitrogen and/or oxygen contained in the first diffusion preventing layer.

20 Claims, 3 Drawing Sheets

FOREIGN PATENT DOCUMENTS

| | | |
|---|---|---|
| JP | A 6-342529 | 12/1994 |
| JP | A 10-16393 | 1/1998 |
| JP | 10-275360 A | 10/1998 |
| JP | A 10-289478 | 10/1998 |
| JP | 11-58962 A | 3/1999 |
| JP | 11-115315 A | 4/1999 |
| JP | 11-250500 A | 9/1999 |
| JP | 2000-36130 A | 2/2000 |
| JP | A 2000-113592 | 4/2000 |
| JP | 2002-74739 A | 3/2002 |
| JP | 2002-279693 A | 9/2002 |
| WO | WO 97/34298 A1 | 9/1997 |
| WO | WO 99/00794 | 1/1999 |
| WO | WO 99/06220 | 2/1999 |
| WO | WO 00/21081 | 4/2000 |

* cited by examiner

Fig. 1
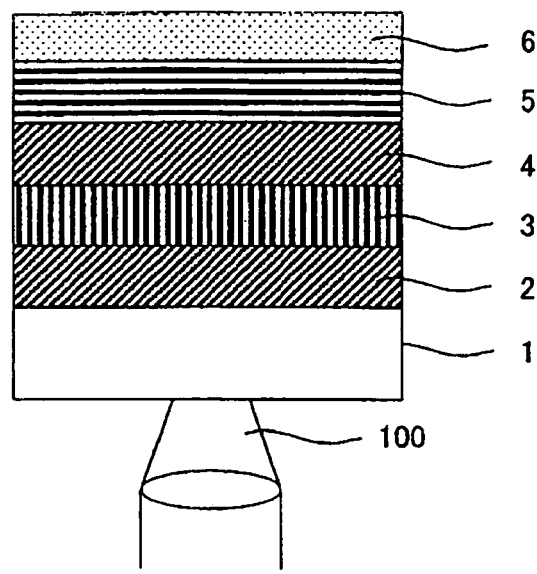
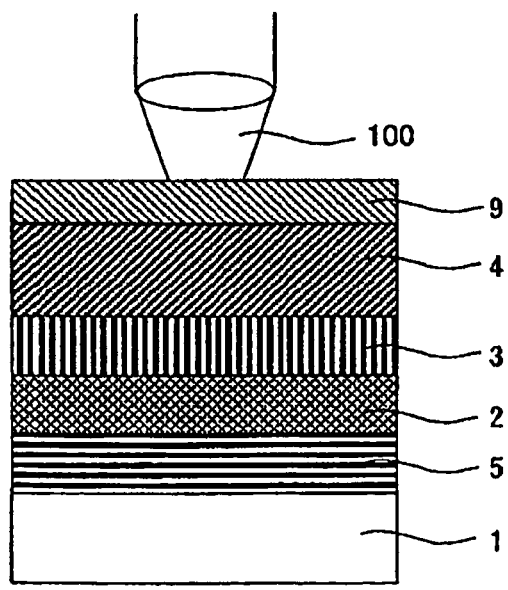 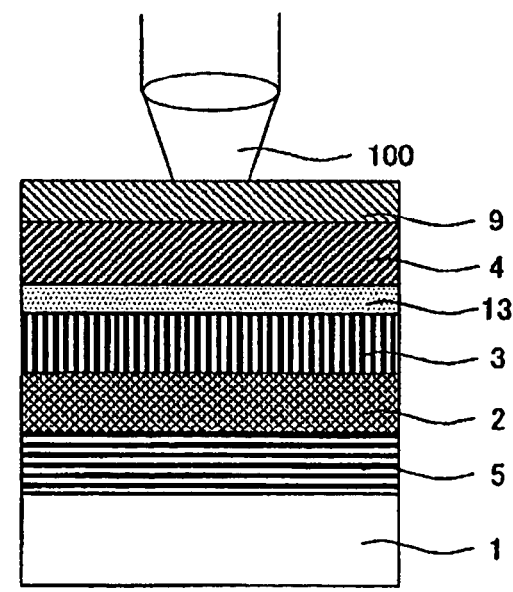
Fig. 2(a)  Fig. 2(b)

OPTICAL RECORDING MEDIUM

TECHNICAL FIELD

The present invention relates to an optical recording medium, particularly an optical recording medium excellent in rewriting cyclability and storage stability.

BACKGROUND ART

A phase change type optical recording medium utilizing the phase transfer between crystalline and amorphous, is known as one of optical recording media capable of recording, retrieving or erasing information by irradiation with light such as a laser beam. The structure of such a phase change type optical recording medium usually takes a multilayer structure as shown in FIG. 1. Namely, on a substrate 1 having concavo-convex, located on the incident side of a laser beam, a phase change recording layer 3 (in this specification, the phase change recording layer may sometimes be referred to simply as a recording layer) made of a phase change material which is usually sandwiched by protective layers 2 and 4 made of a dielectric material such as a mixture of ZnS and $SiO_2$, is formed. Further, on the protective layer 4, a reflective layer 5 composed mainly of Au, Al, Ag or the like as the main component, which serves as a heat diffusion layer, is formed. On the reflective layer 5, an overcoat layer 6 made of an ultraviolet curable resin or the like, is formed. As a typical material system for the recording layer 3, a $Ge_2Sb_2Te_5$ system having a composition close to an intermetallic compound, or a system having a composition close to $Sb_{0.7}Te_{0.3}$, eutectic point of Sb—$Sb_2Te_3$, as the main component, may be mentioned.

The recording principle of such a phase change-optical recording medium is as follows. After the film formation, the above recording layer is amorphous, and accordingly, the reflectance of the phase change type optical recording medium is low. Therefore, after formation of the recording layer, the phase change type optical recording medium is irradiated with a laser beam to heat the recording layer to carry out the step of crystallizing the recording layer over the entire surface of the substrate to let the entire surface of the phase change type optical recording medium have a high reflectance (in this specification, this step may be referred to as initial crystallization). Such an initially crystallized phase change type optical recording medium is locally irradiated with a laser beam, so that the recording layer is melted and quenched and thereby changed to an amorphous state. Along with this phase change, the optical nature of the recording layer changes, whereby information will be recorded. Retrieving of information is carried out by irradiating a laser beam weaker than during the recording, and detecting the difference in the optical nature between the crystalline state and the amorphous state as a difference in the reflectance. Rewriting of information is carried out by directly rewriting a record mark present in the recording layer to a new record mark by irradiating the optical recording medium with a laser beam having a writing peak power superposed on an erasing power with a low energy to cause crystallization.

With a rewritable phase change type optical recording medium, as rewriting is repeated many times, there may be a case where mutual diffusion of constituting atoms or a chemical reaction will take place between the recording layer 3 and protective layers 2 and 4 in contact therewith. Such mutual diffusion of constituting atoms or a chemical reaction will deteriorate the quality of a record mark in such a form as a decrease in the signal amplitude of a record mark or an increase in the jitter value, whereby the number of repetitive rewriting times of the optical recording medium will be reduced.

In order to solve such a problem, a method has been proposed to provide a single layer of a diffusion preventing layer made of e.g. GeN between the recording layer and the protective layer (WO 97/34298). Such a diffusion preventing layer of e.g. GeN has a function to prevent mutual diffusion of constituting atoms between the protective layer and the recording layer, and it is thereby intended to improve the number of repetitive rewriting times for rewriting information.

DISCLOSURE OF THE INVENTION

In recent years, in order to use an optical recording medium for recording and retrieving a large volume of data for e.g. animation for long hours, it has been desired to develop a high performance optical recording medium which is capable of recording at a higher speed, rewritable in more times and capable of higher densification of information, as compared with conventional recording media.

Especially, in order to accomplish high densification of the optical recording medium, an optical recording medium has been proposed which is capable of recording information of at least 20 GB in a CD size with a diameter of 12 cm by using a blue color laser having a wavelength of 405 nm and an object lens having a numerical aperture NA as large as 0.85 (Jpn. J. Appl. Phys. Vol. 39 (2000) pp. 756–761, Part 1, No 2B, February 2000). With this optical recording medium, the wavelength is short, and the numerical aperture of the object lens is large, whereby it is necessary to maintain a margin for the inclination (tilt) of the optical recording medium. Accordingly, as opposed to the conventional substrate side incident type layered structure as shown in FIG. 1, this optical recording medium is designed, as shown in FIG. 2(a) to have a reflective layer 5 between a substrate 1 and a recording layer 3 and to carry out recording and retrieving by applying a laser beam to the phase change recording layer from the side of the recording layer 3 opposite to the substrate 1 side. Such an optical recording medium is commonly called "film side incident type optical recording medium".

However, by a study made by the present inventors, it has been found that with a film side incident type optical recording medium (hereinafter sometimes referred to simply as "an optical recording medium"), because of the high densification, the deterioration of the optical recording medium due to repeated rewriting appears more distinctly. Further, it has been found that this deterioration is attributable to mutual diffusion of constituting atoms between the recording layer 3 and the protective layer 4 located at the incident side. It has been found that the mutual diffusion of constituting atoms between the recording layer 3 and the protective layer 4 becomes particularly distinct when the protective layer 4 contains sulfur.

Here, the present inventors have attempted to suppress the mutual diffusion of constituting atoms between the recording layer 3 and the protective layer 4 by using the technique disclosed in the above Patent Document 1. Namely, as shown in FIG. 2(b), a single layer of a diffusion preventing layer 13 was formed between the recording layer 3 and the protective layer 4, and the proportion of the gas component such as nitrogen in this diffusion preventing layer 13 was changed in detail. However, as compared with the conventional optical recording medium, the optical recording medium employing the above-mentioned single layer of a diffusion preventing layer 13 did not become an optical recording medium wherein the number of rewritable times and the storage stability are balanced at a higher level. Particularly, it has been found that when it is attempted to improve the number of rewritable times, the problem of storage stability tends to be serious, and if the optical recording medium is held in a high temperature and high humidity environment, peeling will result between the recording layer and the diffusion preventing layer, whereby the storage stability of the recording medium deteriorates.

In view of the above problems, the present invention has been made to effectively solve such problems, and its object is to take a balance of the rewriting cyclability and the storage stability of the optical recording medium at a higher level than the conventional optical recording medium.

The present inventors have conducted an extensive study in view of the above situation, and as a result, have found it possible to take a balance of a rewriting cyclability and the storage stability at a higher level than the conventional optical recording medium, by separating the functions of the diffusion preventing layer present between the recording layer and the protective layer as between the recording layer side and the protective layer side, and thus have accomplished the present invention.

Namely, the first gist of the present invention resides in an optical recording medium comprising a reflective layer and a phase change recording layer formed in this order on a substrate, so that recording and retrieving information is carried out by applying a laser beam to the phase change recording layer from the side of the phase change recording layer opposite to the substrate side, characterized in that:

a diffusion preventing layer is formed in contact with the phase change recording layer on the side of the phase change recording layer opposite to the substrate side, a protective layer containing sulfur, is formed in contact with the diffusion preventing layer, the diffusion preventing layer is constituted by at least two layers, which comprise a non-gas element and nitrogen and/or oxygen as the main components, and when among at least two layers constituting the diffusion preventing layer, the layer in contact with the phase change recording layer is designated as a first diffusion preventing layer, and the layer in contact with the protective layer is designated as a second diffusion preventing layer, the amount (atomic %) of nitrogen and/or oxygen contained in the second diffusion preventing layer is larger than the amount (atomic %) of nitrogen and/or oxygen contained in the first diffusion preventing layer.

Further, the second gist of the present invention resides in an optical recording medium comprising a reflective layer and a phase change recording layer formed in this order on a substrate, so that recording and retrieving information is carried out by applying a laser beam to the phase change recording layer from the side of the phase change recording layer opposite to the substrate side, characterized in that:

a diffusion preventing layer is formed in contact with the phase change recording layer on the side of the phase change recording layer opposite to the substrate side, a protective layer containing sulfur, is formed in contact with the diffusion preventing layer, the diffusion preventing layer comprises a non-gas element and nitrogen and/or oxygen as the main components, and the content (atomic %) of nitrogen and/or oxygen at the interface between the diffusion preventing layer and the protective layer is larger than the content (atomic %) of nitrogen and/or oxygen at the interface between the diffusion preventing layer and the phase change recording layer.

Now, the background of the present invention as summarized above will be described.

Even if a single layer of a diffusion preventing layer made of a uniform composition is formed between the recording layer and the protective layer, it is hardly possible to simultaneously satisfy the rewriting cyclability and the storage stability, because the rewriting cyclability and the storage stability are in a trade off relation depending upon the degree of the content of the gas component such as nitrogen or oxygen contained in the diffusion preventing layer.

Namely, if the proportion of the gas component such as nitrogen present in the diffusion preventing layer increases, the mutual diffusion of constituting atoms between the recording layer and the protective layer will be effectively suppressed when rewriting is carried out repeatedly, whereby the rewriting cyclability will be improved, but peeling is likely to take place between the recording layer and the diffusion preventing layer during a high temperature and high humidity storage, whereby the storage stability (storage stability) of the optical recording medium tends to deteriorate.

Inversely, if the proportion of the gas component such as nitrogen present in the diffusion preventing layer decreases, peeling tends to hardly take place between the recording layer and a diffusion preventing layer during a high temperature and high humidity storage, whereby the storage stability (storage stability) of the optical recording medium will be improved, but mutual diffusion of constituting atoms between the recording layer and the protective layer during repeated rewriting can not be prevented, whereby the rewriting cyclability tends to deteriorate.

Further, in the film side incident type optical recording medium, the protective layer located on the substrate side of the recording layer is in contact with a reflective layer having a high heat dissipation property, while the protective layer located on the incident side is not in contact with a member having a high heat dissipation property. Therefore, if rewriting is carried out repeatedly on such a film side incident type optical recording medium, the thermal storage of the protective layer located on the incident side tends to be large, whereby diffusion of constituting atoms of the protective layer tends to take place. Accordingly, it is preferred to increase the content of the gas component such as nitrogen in the diffusion preventing layer to be inserted between the recording layer and the protective layer located on the incident side.

On the other hand, if the protective layer (on the substrate side), the diffusion preventing layer (on the substrate side), the recording layer, the diffusion preventing layer (on the incident side) and the protective layer (on the incident side) are laminated in this order on the substrate by a sputtering method, peeling tends to occur between the recording layer and the diffusion preventing layer (on the incident side) to be formed after the recording layer. The reason for such tendency is considered to be as follows.

Namely, at the time of producing an optical recording medium, if the protective layer (on the substrate side), the diffusion preventing layer (on the substrate side), the recording layer, the diffusion preventing layer (on the incident side) and the protective layer (on the incident side) are formed in this order on the substrate by a sputtering method, at the time of forming the recording layer on the diffusion preventing layer (on the substrate side), an excess gas component (such as nitrogen or oxygen) on the diffusion preventing layer (on the substrate side) will be evacuated by the evacuation of the chamber before the formation of the recording layer, whereby the residual gas at the interface between the diffusion preventing layer (on the substrate side) and the recording layer, tends to be extremely small. Whereas, at the time of forming the diffusion preventing layer (on the incident side, i.e. the diffusion preventing layer located on the side of the recording layer opposite to the substrate side) to be formed after the recording layer, a gas such as nitrogen will be blown to the surface of the recording layer, whereby an excess gas component such as nitrogen tends to enter into the interface between the recording layer and the diffusion preventing layer (on the incident side). It is conceivable that under these conditions, peeling tends to take place between the recording layer and the diffusion preventing layer (on the incident side) during a high temperature and high humidity storage. Accordingly, with a view to suppressing peeling, it is advisable to reduce the content of the gas component such as nitrogen in the diffusion preventing layer (on the incident side) to be inserted between the recording layer and the protective layer on the incident side, as far as possible.

In summary of the foregoing, with the film side incident type optical recording medium, ($\alpha$) from the viewpoint of carrying out repetitive rewriting satisfactorily, it is preferred to increase the content of the gas component such as nitrogen in the diffusion preventing layer to be inserted between the recording layer and the protective layer located on the incident side, while ($\beta$) in consideration of peeling by a high temperature and high humidity storage, it is preferred to minimize the content of nitrogen in the diffusion preventing layer to be inserted between the recording layer and the protective layer located on the incident side. Namely, with the film side incident type optical recording medium, the trade off of the above ($\alpha$) and the above ($\beta$) becomes especially distinct. Accordingly, with the film side incident type optical recording medium, it is extremely difficult to satisfy both prevention of mutual diffusion of constituting atoms between the recording layer and the protective layer and the storage stability (prevention of peeling at the diffusion preventing layer).

Under these circumstances, the present inventors have found it possible to obtain an optical recording medium satisfying the storage stability and the rewriting cyclability at a high level with a film side incident type optical recording medium, by proficiently utilizing the phenomenon that the rewriting cyclability and the storage stability are in a trade off relation depending upon the degree of the content of the gas content such as nitrogen or oxygen in the diffusion preventing layer. Namely, with respect to the diffusion preventing layer formed between the recording layer and the protective layer on the incident side, if the content of the gas component is reduced in the diffusion preventing layer in the vicinity of the interface with the recording layer, the adhesion between the recording layer and the diffusion preventing layer is secured, whereby the storage stability will be made satisfactory, while if the content of the gas component is increased in the diffusion preventing layer in the vicinity of the interface with the protective layer, the mutual diffusion of constituting atoms between the recording layer and the protective layer will be suppressed, whereby the rewriting cyclability will be made satisfactory. The present invention has been accomplished on the basis of such discoveries.

In the present invention, "excellent in the storage stability" means that no substantial peeling will be formed even after the storage under a high temperature and high humidity condition. Such peeling after the storage under a high temperature and high humidity condition, can be observed by an optical microscope. Further, in order to more strictly evaluate whether or not substantial peeling has taken place after the storage under a high temperature and high humidity condition, an increase of the bit error after the storage under a high temperature and high humidity condition, may be measured.

Usually, in an optical recording medium, peeling will be a local defect which increases an error rate. However, if the size of the peeled area is sufficiently small, and the number of peeled portions is sufficiently small, such will not appear as an increase of the error rate. In such a case, the optical recording medium will be excellent in the storage stability. With respect to the size of the peeled area, one having at least $\lambda/(2NA)$ will be an error, where $\lambda$ is the wavelength for recording and retrieving, and NA is the numerical aperture of the object lens.

Further, usually, with an optical recording medium, if the bit error rate is at a level of not more than $10^{-3}$, the error may be corrected by error correction by a Reed-Solomon symbol and the like, although such may depend also on the format and the like. Accordingly, peeling with a size at a level of $\lambda/(2NA)$, can be error-corrected, if it is dispersed with an average distance at a level of $100\times\lambda/(2NA)$. However, even in a case where the number of peeled portions is sufficiently small, if the size of one peeled area exceeds 50 $\mu$m, correction will be impossible.

According to the present invention, it is possible to obtain an optical recording medium which simultaneously satisfies the recording characteristics and the storage stability at a higher level than the conventional optical recording medium. Especially with a film side incident type optical recording medium capable of high density recording, the rewriting cyclability and the storage stability under a high temperature and high humidity condition, can be remarkably improved.

Specifically, by functionally separating the diffusion preventing layer formed between the recording layer and the protective layer into the side in contact with the recording layer and the side in contact with the protective layer, it will be possible to satisfy the storage stability and the rewriting cyclability of a film side incident type optical recording medium at a very high level with a good balance.

BRIEF DESCRIPTION OF THE DRAWINGS

FIG. 1 is a diagrammatical cross-sectional view showing a conventional layered structure of a substrate side incident type optical recording medium.

FIG. 2 is a diagrammatical cross-sectional view showing a conventional layered structure of a film side incident type optical recording medium.

MEANINGS OF SYMBOLS

Figure 3A:
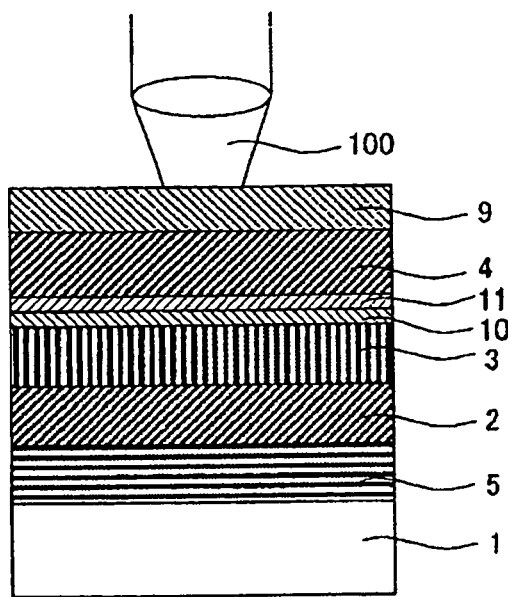
FIG. 3 is a diagrammatical cross-sectional view showing an example of the layered structure of an optical recording medium in a first embodiment of the present invention.

1: Substrate
2: Protective layer (lower)
3: Recording layer
4: Protective layer (upper)

5: Reflective layer
7: Diffusion preventing layer (one having the composition changed at the interface)
8: Interface layer as a substitute for the protective layer
9: Light transmitting layer
10: First diffusion preventing layer
11: Second diffusion preventing layer
12: Under layer
13: Diffusion preventing layer
14: Interface layer of the reflective layer
100: Laser beam.

BEST MODE FOR CARRYING OUT THE INVENTION (A) First Embodiment of the Present Invention The optical recording medium in the first embodiment of the present invention is an optical recording medium comprising a reflective layer and a phase change recording layer formed in this order on a substrate, so that recording and retrieving information is carried out by applying a laser beam to the phase change recording layer from the side of the phase change recording layer opposite to the substrate side, characterized in that:

a diffusion preventing layer is formed in contact with the phase change recording layer on the side of the phase change recording layer opposite to the substrate side, a protective layer containing sulfur, is formed in contact with the diffusion preventing layer, the diffusion preventing layer is constituted by at least two layers, which comprise a non-gas element and nitrogen and/or oxygen as the main components, and when among at least two layers constituting the diffusion preventing layer, the layer in contact with the phase change recording layer is designated as a first diffusion preventing layer, and the layer in contact with the protective layer is designated as a second diffusion preventing layer, the amount (atomic %) of nitrogen and/or oxygen contained in the second diffusion preventing layer is larger than the amount (atomic %) of nitrogen and/or oxygen contained in the first diffusion preventing layer.

In the first embodiment of the present invention, the diffusion preventing layer is constituted by at least two layers as described above, whereby the rewriting cyclability and the storage stability for an optical recording medium can be satisfied simultaneously.

In the present invention, "the diffusion preventing layer" to be formed between the recording layer and the protective layer is a layer which is present between the recording layer and the protective layer and which prevents the mutual diffusion of constituting atoms or a chemical reaction between the recording layer and the protective layer and consequently improves the number of repetitive rewriting times of the optical recording medium. Further, in the present invention, "comprising a non-gas element and nitrogen and/or oxygen as the main components" means that the total content of the non-gas element and nitrogen and/or oxygen is at least 50 atomic % in the diffusion preventing layer.

When rewriting of the optical recording medium is repeated, diffusion of constituting elements of the recording layer and the protective layer takes place. Specifically, in a case where sulfur or a sulfide is contained in the protective layer, if rewriting is repeated, a phenomenon of diffusion of sulfur atoms into the recording layer will take place. In the first embodiment of the present invention, the first diffusion preventing layer and the second diffusion preventing layer are formed for preventing diffusion of such components, as the main object. With such an object, the first diffusion preventing layer and the second diffusion preventing layer are made so that the non-gas element and nitrogen and/or oxygen will be the main components, while the composition of the first diffusion preventing layer is adjusted so that mutual diffusion of constituting elements with the recording layer will not take place, and the adhesion with the recording layer will be improved, and the composition of the second diffusion preventing layer is made to be one whereby no mutual diffusion of constituting elements with the protective layer will take place, whereby, as a result, it is possible to simultaneously satisfy the prevention of diffusion of constituting elements between the recording layer and the protective layer and the adhesion of the recording layer and the diffusion preventing layer.

In the first embodiment of the present invention, the diffusion preventing layer is constituted by at least two layers containing the non-gas element and nitrogen and/or oxygen as the main components. Namely, the diffusion preventing layer is made to be at least two layers having the first diffusion preventing layer and the second diffusion preventing layer. Its layered structure is not particularly limited so long as it is capable of effectively preventing diffusion of constituting elements between the recording layer and the protective layer even when rewriting is carried out repeatedly. However, it is preferred from the viewpoint of the production efficiency and the production costs that the diffusion preventing layer is constituted by two layers of the first diffusion preventing layer and the second diffusion preventing layer. Now, the optical recording medium to be used in the first embodiment of the present invention will be described with reference to a case where the diffusion preventing layer has a double layered structure comprising the first diffusion preventing layer and the second diffusion preventing layer.

As described above, in the first embodiment of the present invention, the diffusion preventing layer is preferably constituted by the first diffusion preventing layer and the second diffusion preventing layer.

Usually, the diffusion preventing layer to be used for an optical recording medium is required to satisfy three points i.e. free from diffusion of constituting elements to the recording layer, free from diffusion of constituting elements to a protective layer, and free from peeling from the recording layer. Here, it is difficult to simultaneously satisfy free from diffusion of constituting elements and free from peeling, since they are opposite as the composition of the diffusion preventing layer. Especially, in a single layer of a diffusion preventing layer made of the same composition, it is possible to simultaneously satisfy up to free from diffusion of constituting elements to the recording layer and free from peeling from the recording layer, but it is particularly difficult to simultaneously satisfy free from diffusion of constituting elements to the protective layer and free from peeling from the recording layer. Therefore, if the diffusion preventing layer is made to have a double layered structure, the first diffusion preventing layer in contact with the recording layer is simply required to have a function to be free from mutual diffusion of constituting elements to the recording layer and to be free from peeling from the recording layer, and the second diffusion preventing layer in contact with the protective layer is simply required to have a function to prevent diffusion of constituting elements to the protective layer. Thus, the diffusion preventing layer is made to have a double layered structure to separate the functions of the diffusion preventing layers, whereby there will be a merit in that freeness to select the material and the layered structure will be widened.

Specifically, it becomes possible to simultaneously satisfy the function to prevent diffusion and the adhesion to the recording layer (storage stability) by decreasing the content (atomic %) of nitrogen and/or oxygen in the first diffusion preventing layer in contact with the recording layer, and increasing the content of nitrogen and/or oxygen in the second diffusion preventing layer in contact with the protective layer.

Especially, in the first diffusion preventing layer and the second diffusion preventing layer, the non-gas element contained in each of them is preferably made to be the same. By making the non-gas element to be the same, it is possible to prepare the first diffusion preventing layer and the second diffusion preventing layer from the same target, whereby it is possible to simplify the production.

Now, a specific example of an optical recording medium according to the first embodiment of the present invention will be described with reference to the drawings, wherein the diffusion preventing layer is constituted by two layers of the first diffusion preventing layer and the second diffusion preventing layer, wherein the non-gas elements to be used in the respective layers are the same. Needless to say, the present invention is by no means restricted to the following specific example.

FIGS. 3(a) to (d) are diagrammatical views showing examples of the layered structures of optical recording media according to the first embodiment of the present invention. For example, the optical recording medium in FIG. 3(a) comprises a reflective layer 5, a protective layer 2, a recording layer 3, a first diffusion preventing layer 10, a second diffusion preventing layer 11, a protective layer 4 and a light transmitting layer 9 laminated in this order on a substrate 1, and a laser beam 100 is applied to the optical recording medium from the upper surface of the light transmitting layer 9.

In the above film side incident type optical recording medium, as compared with the protective layer 2, the protective layer 4 tends to have a very large thermal storage by irradiation with a laser during recording, as it is not in contact with a reflective layer having a high heat dissipation property. Accordingly, with an optical recording medium having a construction as in FIG. 2(a), diffusion of constituting atoms between the recording layer 3 and the protective layer 4 by repetitive rewriting will be distinct. In addition, with the above film side incident type optical recording medium, the recording density is made to be higher density than the conventional optical recording medium, whereby a little deterioration of the optical recording medium tends to be more distinct. Accordingly, in the above film side incident type optical recording medium, deterioration of the signal quality of the optical recording medium caused by the mutual diffusion of constituting atoms between the recording layer 3 and the protective layer 4 by repetitive rewriting will be particularly distinct.

Further, the optical recording medium may be made to be one having a structure as shown in FIG. 2(b) wherein a diffusion preventing layer 13 is formed between the recording layer 3 and the protective layer 4. However, as mentioned above, in the film side incident type optical recording medium, the thermal storage of the protective layer 4 on the incident side of a short wavelength laser 100 is larger, whereby the diffusion preventing layer 13 on the incident side is desired to have a stronger function to prevent the mutual diffusion of constituting elements between the recording layer 3 and the protective layer 4. In a case where the diffusion preventing layer 13 is constituted by a nitride, an oxide or a oxynitride, this means to increase the content of nitrogen and/or oxygen in the diffusion preventing layer 13. However, on the other hand, the diffusion preventing layer 13 is formed after the recording layer 3, and if the content of nitrogen and/or oxygen is increased, peeling between the recording layer 3 and the diffusion preventing layer 13 tends to occur more readily. Namely, for the film side incident type optical recording medium capable of recording with a higher density, it becomes very important to take a balance between the storage stability and the stability during repetitive rewriting. Accordingly, the effects by functional separation of the diffusion preventing layer as shown in FIGS. 3(a) to (d) will be remarkable in an application to the film side incident type optical recording medium.

Now, the materials, thicknesses and production methods, etc. of the respective layers constituting the optical recording medium according to the first embodiment of the present invention, will be described.

(1) First Diffusion Preventing Layer 10, and Second Diffusion Preventing Layer 11

The first diffusion preventing layer and the second diffusion preventing layer comprise a non-gas element and nitrogen and/or oxygen, as the main components, and the non-gas elements in the first diffusion preventing layer and the second diffusion preventing layer are the same. Here, the non-gas elements to be contained in the first diffusion preventing layer and the second diffusion preventing layer may be of one type or two or more types.

Further, in the first diffusion preventing layer and the second diffusion preventing layer, either nitrogen, oxygen, or nitrogen and oxygen, may be present together with the non-gas elements. However, it is preferred to employ either nitrogen, or nitrogen and oxygen, and more preferred to employ nitrogen.

The non-gas element may be any element which is not a gas or liquid in the state of a single substance or molecule at a normal temperature under a normal pressure (i.e. at 25° C. under 1 atm), and an element such as hydrogen (H), nitrogen (N), oxygen (O), fluorine (F), chlorine (Cl), bromine (Br), helium (He), neon (Ne), argon (Ar), krypton (Kr) or xenon (Xe) is excluded.

Specifically, as the non-gas element, it is preferred to employ at least one element selected from the group consisting of Si, Ge, Al, Ti, Ta, Cr, Mo, Sb, Sn, Nb, Y, Zr and Hf. Nitrides, oxides or oxynitrides of these non-gas elements are stable, whereby the storage stability of the optical recording medium will be improved. Such non-gas elements may be employed in a plurality. Specifically, a plurality of the above elements, or a plurality of the above elements and non-gas elements other than the above elements, may be employed. As the non-gas element, more preferred is Si, Ge, Al or Cr which is highly transparent and excellent in adhesion. As the non-gas element to be used, particularly preferred is Ge and/or Cr.

In a case where one type of the non-gas element is to be used, a nitride or oxide of the single substance of the non-gas element may be mentioned as the material constituted by the non-gas element and nitrogen and/or oxygen. More specifically, compositions in the vicinity of $Si_3N_4$, $Ge_3N_4$, CrN, AlN, $SiO_2$, GeO, $GeO_2$, CrO, $Cr_2O_3$, $AL_2O_3$, etc, may be mentioned. Among them, it is preferred to use $Si_3N_4$, $Ge_3N_4$ or AlN from such a viewpoint that the effect for preventing diffusion for the eutectic recording layer, is higher. Further, in a case where an oxynitride is to be employed, a mixture of the above-mentioned nitride and oxide of the single substance of the non-gas element, may be employed.

In a case where two or more non-gas elements are to be used, as a material constituted by the non-gas elements and nitrogen and/or oxygen, a nitride or oxide of a composite of non-gas elements may be mentioned. As such a compound, a typical example employing Ge—N may be one containing Al, B, Ba, Bi, C, Ca, Ce, Cr. Dy, Eu, Ga, In, K, La, Mo, Nb, Ni, Pb, Pd, Si, Sb, Sn, Ta, Te, Ti, V, W, Yb, Zn, Zr, etc., together with Ge, like Ge—Si—N, Ge—Sb—N, Ge—Cr—N, Ge—Al—N, Ge—Mo—N or Ge—Ti—N. Among them, it is experientially preferred to employ Ge—Cr—N, Ge—Al—N or Ge—Mo—N, although the reason is not clearly understood, and it is particularly preferred to employ Ge—Cr—N. Further, in a case where an oxynitride is to be used, a mixture of a nitride and an oxide of the above-mentioned non-gas element composites, may be employed.

The total content of the non-gas element and nitrogen and/or oxygen in the first diffusion preventing layer 10 and in the second diffusion preventing layer 11, is usually at least 70 atomic %, preferably at least 90 atomic %, more preferably at least 95 atomic %, most preferably at least 99 atomic %. In this manner, it is possible to effectively suppress peeling from the recording layer, and it is possible to improve the rewriting cyclability.

The first diffusion preventing layer 10 and the second diffusion preventing layer 11 may contain other elements within a range not to impair the characteristics of the layer, as the case requires. When other elements are contained, the content of such elements is preferably at most 10 atomic %, more preferably at most 5 atomic %, particularly preferably at most 1 atomic %. Further, such an element is not particularly limited, but when it is an element having a nature which diffuses in the layer, such as e.g. sulfur, its content is preferably at most 1 atomic %.

Here, the content of nitrogen and/or oxygen in the first diffusion preventing layer 10 is usually at least 3 atomic %, preferably at least 5 atomic %, more preferably at least 10 atomic %. Within such a range, it is possible to obtain a diffusion preventing layer having an optically small absorption. On the other hand, the content of nitrogen and/or oxygen in the first diffusion preventing layer 10 is usually at most 50 atomic %, preferably at most 45 atomic %, more preferably at most 40 atomic %. Within such a range, it is possible to prevent peeling between the recording layer and the first diffusion preventing layer 10.

Further, the content of nitrogen and/or oxygen in the second diffusion preventing layer 11 is usually at least 40 atomic %, while it is usually at most 70 atomic %, preferably at most 65 atomic %, more preferably at most 60 atomic %. Within such a range, it is possible to suppress the chemical reaction and diffusion of constituting atoms between the protective layer and the second diffusion preventing layer 11.

In the present invention, while adjusting the contents of nitrogen and/or oxygen in the first diffusion preventing layer 10 and the second diffusion preventing layer 11 to the above ranges, the content (atomic %) of nitrogen and/or oxygen contained in the second diffusion preventing layer is made larger than the content (atomic %) of nitrogen and/or oxygen contained in the first diffusion preventing layer 10.

The ratio of the contents of nitrogen and/or oxygen contained respectively in the first diffusion preventing layer 10 and the second diffusion preventing layer 11, i.e. (content of nitrogen and/or oxygen in the first diffusion preventing layer 10)/(content of nitrogen and/or oxygen in the second diffusion preventing layer 11), is usually smaller than 1, preferably at most 0.8, more preferably at most 0.6, further preferably at most 0.5, most preferably at most 0.4. Within such a range, the balance of the rewriting cyclability and the storage stability of the optical recording medium will be good. The analyses of the compositions of the first diffusion preventing layer 10 and the second diffusion preventing layer 11 can be carried out by a combination of an Auger electron spectrophotometry (AES), a Rutherford backscattering method (RBS), an induction coupling high frequency plasma photometry (ICP), etc. And, by such analyses of the compositions, the contents (atomic %) of nitrogen and/or oxygen in the first diffusion preventing layer 10 and the second diffusion preventing layer 11, can be obtained.

The thicknesses of the first diffusion preventing layer 10 and the second diffusion preventing layer 11 are usually at least 1 nm, respectively. Within such a range, it becomes possible to suppress diffusion of sulfur even in a case where $ZnS$—$SiO_2$ is employed, which is widely used for a protective layer. Further, if the film thickness is excessively thin, a uniform diffusion preventing layer may not be obtained. On the other hand, the thickness of the first diffusion preventing layer 10 and the second diffusion preventing layer 11 is usually at most 20 nm, preferably at most 10 nm, more preferably at most 7 nm, further preferably at most 5 nm, particularly preferably at most 3 nm. Within such a range, it becomes possible not only to prevent diffusion of constituting atoms between the recording layer and the protective layer but also to suppress the membrane stress to a small degree thereby to certainly obtain a diffusion preventing layer excellent in the storage stability, free from peeling. Further, if the content of nitrogen and/or oxygen in the first diffusion preventing layer 10 is reduced, it may happen that the transparency tends to be hardly secured, but by adjusting the film thickness within the above range, the transparency of the first diffusion preventing layer 10 can more easily be secured.

The ratio of the thickness of the first diffusion preventing layer 10 to the thickness of the second diffusion preventing layer 11, i.e. (thickness of the first diffusion preventing layer 10)/(thickness of the second diffusion preventing layer 11), is usually at least 0.1, preferably at least 0.2, more preferably at least 0.3, while it is usually at most 10, preferably at most 5, more preferably at most 3.

The first diffusion preventing layer 10 and the second diffusion preventing layer 11 can, respectively, be produced by a sputtering method wherein a very small amount of Ar gas is circulated in a vacuum chamber to a predetermined vacuum pressure, and a voltage is applied to a target made of a nitride, oxide or oxynitride of a simple substance of the non-gas element having a different content of nitrogen and/or oxygen, or a nitride, oxide or oxynitride of a composite of non-gas elements, having a different content of nitrogen and/or oxygen to carry out discharge and film forming.

Otherwise, the first diffusion preventing layer 10 and the second diffusion preventing layer 11 may be formed by a reactive sputtering method wherein in a vacuum chamber, a very small amount of a mixed gas of Ar, $N_2$ and/or $O_2$ is circulated to a predetermined vacuum pressure, and a voltage is applied to a target made of a simple substance of a non-gas element or a composite of non-gas elements to carry out discharge and to have the punched out non-gas element simple substance or composite reacted with $N_2$ and/or $O_2$ to form a nitride, oxide or oxynitride thereby to carry out film forming.

If this reactive sputtering is employed, the degree of nitrification or the oxidizing amount can be changed by changing the $N_2$ partial pressure and/or the $O_2$ partial pressure of the mixed gas of Ar, $N_2$ and/or $O_2$ circulated in the vacuum chamber. In a case where the non-gas elements contained in the first diffusion preventing layer 10 and the second diffusion preventing layer 11, respectively, are made to be the same, whereby the first diffusion preventing layer 10 and the second diffusion preventing layer 11 can be continuously formed in the same chamber by using the same target, and the production can be facilitated.

For example, in a case where nitrogen is employed as the gas component in the first diffusion preventing layer and the second diffusion preventing layer, the flow rate of $N_2/(Ar+N_2)$ at the time of forming the first diffusion preventing layer is usually at most 0.5, preferably at most 0.4, more preferably at most 0.3, further preferably at most 0.2, particularly preferably at most 0.1. On the other hand, the flow rate of $N_2/(Ar+N_2)$ for forming the first diffusion preventing layer is usually at least 0.01. Within such a range, the content (atomic %) of nitrogen in the first diffusion preventing layer can be made to a desired level. Whereas, the flow rate of $N_2/(Ar+N_2)$ at the time of forming the second diffusion preventing layer is usually at least 0.3, preferably at least 0.4, more preferably at least 0.5. On the other hand, the flow rate of $N_2/(Ar+N_2)$ at the time of forming the second diffusion preventing layer is usually at most 0.8. Within such a range, the content (atomic %) of nitrogen in the second diffusion preventing layer can be made to the desired level.

Figure 3B:
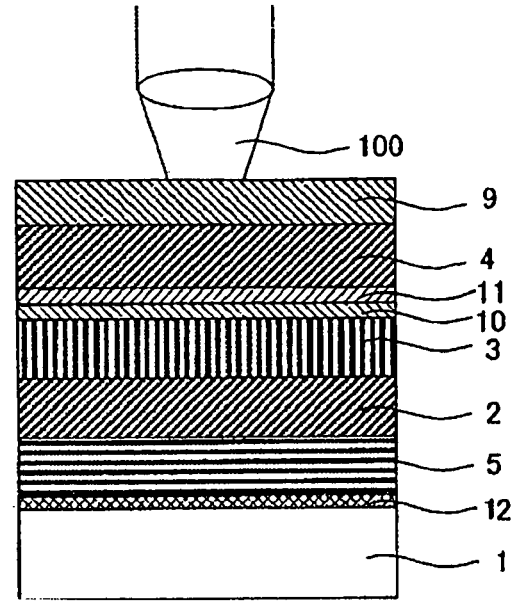
Figure 3C:
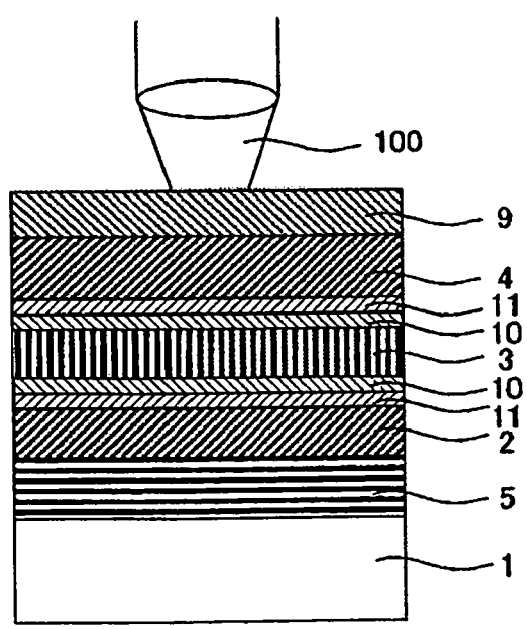

Further, as shown in FIG. 3(c), on each side of the recording layer 3, the first diffusion preventing layer 10 and the second diffusion preventing layer 11 may be formed. Namely, with the layered structure of the protective layer 2, the second diffusion preventing layer 11, the first diffusion preventing layer 10, the recording layer 3, the first diffusion preventing layer 10, the second diffusion preventing layer 11 and the protective layer 4, it is possible to satisfy the rewriting cyclability and the storage stability at a very high level.

Further, in the first embodiment of the present invention, it is preferred that each of the first diffusion preventing layer and the second diffusion preventing layer contains Ge, Cr and N, the content (atomic %) of N contained in the second diffusion preventing layer is larger than the content (atomic %) of N contained in the first diffusion preventing layer, and the protective layer containing ZnS is formed in contact with the second diffusion preventing layer. Namely, for example, in a case where the protective layer is composed mainly of ZnS—$SiO_2$, and the recording layer is composed mainly of a composition in the vicinity of $Sb_{0.7}Te_{0.3}$, as the first diffusion preventing layer 10 and the second diffusion preventing layer 11, GeCrN is employed as the material, and the nitrogen content in the first diffusion preventing layer 10 is made small, and the nitrogen content in the second diffusion preventing layer 11 is made to be large. By using the above material for both the first diffusion preventing layer 10 and the second diffusion preventing layer 11, it will be possible to effectively preventing diffusion of constituting elements between the recording layer and the protective layer, while preventing peeling between the recording layer and the first diffusion preventing layer 10, whereby an optical recording medium excellent in the storage stability will be obtained.

Namely, in a case where only a single layer of a diffusion preventing layer is employed, if GeCrN is selected as a diffusion preventing layer, and if its degree of nitrification is made small, it is possible to obtain a film which is free from peeling even under a high temperature and high humidity condition. However, if GeCrN having a small degree of nitrification is employed as a single layer of a diffusion preventing layer, mutual diffusion of constituting elements will not occur directly between the diffusion preventing layer and the recording layer, but it will be difficult to suppress mutual diffusion of constituting elements between the diffusion preventing layer and ZnS—$SiO_2$ used for the protective layer, and sulfur in ZnS—$SiO_2$ will diffuse into the diffusion preventing layer made of a single layer of GeCrN and then will diffuse also in the recording layer, whereby good rewriting cyclability can not be obtained.

Inversely, in a case where only a single layer of a diffusion preventing layer is employed, if GeCrN having a large degree of nitrification is used as the single layer of the diffusion preventing layer, mutual diffusion of constituting elements will be suppressed between the recording layer and the protective layer, whereby good repetitive rewriting properties can be obtained, but on the other hand, under a high temperature and high humidity condition, peeling tends to result between the diffusion preventing layer and the recording layer, whereby good storage stability can not be obtained.

Therefore, in the first embodiment of the present invention, the diffusion preventing layer is made into two layers, and the nitriding, oxidizing or oxynitriding degree of the first diffusion preventing layer 10 is made small to suppress peeling at the interface with the recording layer, while the nitriding, oxidizing or oxynitriding degree of the second diffusion preventing layer 11 in contact with the protective layer is made large to suppress diffusion of constituting elements at the interface with the protective layer, whereby it becomes possible to improve the rewriting cyclability and the storage stability at the same time.

(2) Substrate 1

For the substrate 1 in FIGS. 3(a) to (d), a resin such as polycarbonate, acryl or polyolefin, or glass may be used. Among them, a polycarbonate resin is most widely used for CD, and it is inexpensive and thus most preferred. Further, in the present invention, a film side incident type optical recording medium is employed, whereby the substrate 1 is not required to be transparent to the laser beam. The thickness of the substrate is usually at least 0.1 mm, preferably at least 0.3 mm, and on the other hand, it is usually at most 3.0 mm, preferably at most 1.5 mm. Usually, it is about 1.2 mm or 0.6 mm.

(3) Protective Layer 2 and Protective Layer 4

The protective layer 2 and the protective layer 4 in FIG. 3 play a role of preventing diffusion of heat generated during the phase change in the recording layer, to another layer such as a substrate, a role of controlling the reflectance of the optical recording medium, or a role as a barrier layer to shield moisture in a storage test under a high temperature and high humidity condition. Different materials may be used for the protective layer 2 and the protective layer 4, but from the viewpoint of productivity, it is preferred to use the same material.

The material to form the protective layers may usually be a dielectric material. Such a dielectric material may, for example, be an oxide of Sc, Y, Ce, La, Ti, Zr, Hf, V, Nb, Ta, Zn, Al, Cr, In, Si, Ge, Sn, Sb, Te or the like, a nitride of Ti, Zr, Hf, V, Nb, Ta, Cr, Mo, W, Zn, B, Al, Ga, In, Si, Ge, Sn, Sb, Pb or the like, a carbide of Ti, Zr, Hf, V, Nb, Ta, Cr, Mo, W, Zn, B, Al, Ga, In, Si or the like, or a mixture thereof. Further, such a dielectric material may also be a sulfide, selenide or telluride of Zn, Y, Cd, Ga, In, Si, Ge, Sn, Pb, Sb, Bi or the like, a fluoride of Mg, Ca or the like, or a mixture thereof.

Further, as a specific example of the dielectric material, ZnS—SiO$_2$, SiN, SiO$_2$, TiO$_2$, CrN, TaS$_2$ or Y$_2$O$_2$S may, for example, be mentioned. Among these materials, ZnS—SiO$_2$ is most widely used in view of the film-forming speed, a small film stress, a small volume change by a temperature change and excellent storage stability. However, ZnS—SiO$_2$ contains a sulfur atom which is reactive with the recording layer. Therefore, when the present invention is applied to a case where this material is used as the protective layer, the effect of the present invention will most remarkably be obtained. Among materials to be used for a protective layer, one containing sulfur may, for example, be TaS$_2$ or Y$_2$O$_2$S. Also in a case where such a material is employed, the effect of the present invention will remarkably be obtained. In the first embodiment of the present invention, the protective layer formed in contact with the diffusion preventing layer on the side of the recording layer opposite to the substrate side is one containing sulfur, and accordingly, in the protective layer 4 formed on the second diffusion preventing layer 11 in FIGS. 3(a) to (d), the above material containing sulfur is to be incorporated.

The thickness of the protective layer varies depending upon the position where the protective layer is employed in the optical recording medium. However, usually, the thickness of the protective layer is preferably at least 2 nm so that the effect for preventing deformation of the recording layer will be sufficient, and it will function as a protective layer. On the other hand, the thickness is preferably at most 500 nm in order to prevent cracking by reducing the internal stress of the dielectric itself constituting the protective layer or by reducing the difference in the elastic properties from the film in contact therewith. Usually, the material to constitute a protective layer has a small film-forming rate and requires a long film-forming time. In order to reduce the cost by reducing the production time by reducing the film-forming time, the thickness of the protective layer is preferably at most 300 nm, more preferably at most 200 nm.

As mentioned above, the function required for a protective layer varies depending upon the position where the protective layer is used in an optical recording medium, and accordingly, the thickness will also varies depending upon the position where the protective layer is employed.

The thickness of the protective layer 4 in FIGS. 3(a) to (d) is usually at least 10 nm, preferably at least 20 nm, more preferably at least 30 nm. Within such a range, the effect for suppressing deformation by heat of the substrate or the recording layer will be sufficient, and the role of the protective layer will be sufficiently be performed. On the other hand, the thickness of the protective layer 4 is usually at most 500 nm, preferably at most 300 nm, more preferably at most 200 nm. If the thickness is too thick, cracking is likely to result due to an internal stress of the film itself, and the productivity will also be poor. Within the above-mentioned range, prevention of cracking and the productivity can be maintained satisfactorily.

Further, with respect to the protective layer 4 on the laser beam incident side, the film thickness d is preferably at least $\lambda/2n$, where n is the refractive index of the protective layer, and $\lambda$ is the wavelength of the incident light. The thickness of the protective layer may be selected so that the medium will have a proper reflectance due to a multiple interference effect of the incident light, and the reflectance will be periodic with $\lambda/2n$ to the thickness d. Further, by making the thickness of the protective layer thick, it will be possible to shield moisture penetrating into the optical recording medium, and thus, the thicker the thickness, the better the storage stability. Especially with a film side incident type optical recording medium, only a very thin light transmitting layer as compared with the substrate is present between the protective layer and the exterior, the moisture shielding effect by the protective layer is important. On the other hand, if the film thickness is too thick, the reflectance distribution resulting from the thickness distribution in the medium plane tends to be distinct, and therefore, the thickness d is preferably at most $\lambda/n$. Thus, in order to satisfy the storage stability and the reflectance distribution at the same time, the thickness d is preferably within a range of at least $\lambda/2n$ and at most $\lambda/n$.

On the other hand, the thickness of the protective layer 2 in FIGS. 3(a) to (c) is usually at least 2 nm, preferably at least 4 nm, more preferably at least 6 nm. Within such a range, deformation of the recording layer can effectively be suppressed. On the other hand, the thickness of the protective layer 2 is usually at most 60 nm, preferably at most 30 nm. Within such a range, there will be no accumulation of microscopic plastic deformation in the interior of the protective layer during repetitive rewriting. Further, the cooling rate of the recording layer will sufficiently be secured.

The protective layer is usually formed by a sputtering method, and the total amount of impurities is preferably less than 2 atomic %, including the amount of impurities of the target itself and the amount of moisture or oxygen included during the film forming. For this purpose, at the time of forming a protective layer by sputtering, the ultimate vacuum degree of the process chamber is preferably less than $1 \times 10^{-3}$ Pa.

Figure 3D:
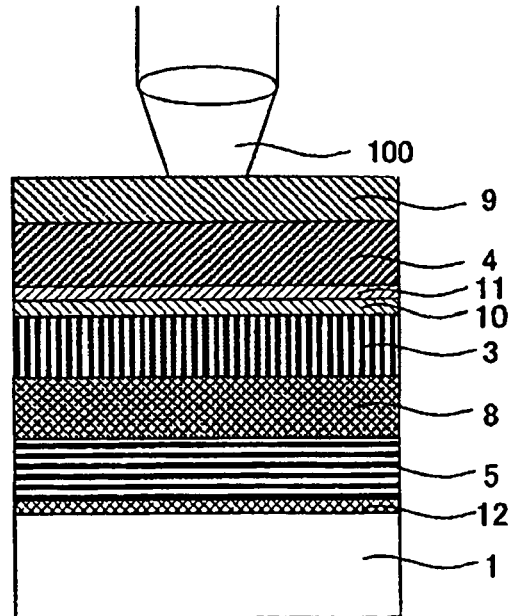

Further, in the present invention, in a case where two protective layers are formed having a recording layer interposed, the protective layer 2 on the side of the recording layer 3 opposite to the protective layer 4 located via the first diffusion preventing layer 10 and the second diffusion preventing layer 11, may be replaced by an interface layer 8 having a uniform composition with the same material (such as GeCrN) as the first diffusion preventing layer 10 and the second diffusion preventing layer 11. Such an example is shown in FIG. 3(d).

(4) Recording Layer 3

The recording layer 3 in FIG. 3 is not particularly limited so long as it is a material capable of phase change between a crystalline phase and an amorphous phase. For example, in addition to an alloy made of In—Ge—Sb—Te, a Ge$_2$Sb$_2$Te$_2$ type having a composition in the vicinity of an intermetallic compound, or various materials such as Te—Sn—Ge, Te—Sb—Ge—Sn, Te—Sn—Ge—Se, Te—Sn—Ge—Au, Ag—In—Sb—Te, In—Sb—Se and In—Te—Se, may be employed.

As compositions for the recording layer in already commercially developed phase change type optical recording media, a composition in the vicinity of Ge$_2$Sb$_2$Te$_5$ as a composition in the vicinity of an intermetallic compound, and a composition in the vicinity of eutectic Sb$_{0.7}$Te$_{0.3}$ (Sb$_{0.7}$Te$_{0.3}$ may sometimes be represented by Sb$_{70}$Te$_{30}$) of Sb$_2$Te$_3$—Sb, such as an In—Ge—Sb—Te type or an Ag—In—Sb—Te type, are mainly used. When these two compositions are compared, the phase change recording material comprising Sb as the main component like the composition in the vicinity of eutectic Sb$_{0.7}$Te$_{0.3}$, is known to show excellent characteristics even when the recording density is made high (Technical Digest ISOM/ODS'99 (1999) (SPIE Vol. 3864) p.191–193). This is considered such that the composition in the vicinity of Sb$_{0.7}$Te$_{0.3}$ is in the vicinity of a eutectic point, whereby the crystal grain size can be made small, and the size and shape of a record mark can be controlled with a high precision.

On the other hand, by a study made by the present inventors, it has been found that with a phase change recording material containing Sb as the main component like the composition in the vicinity of eutectic $Sb_{0.7}Te_{0.3}$, peeling from the diffusion preventing layer material is likely to occur, as compared with a phase change recording material having a composition in the vicinity of $Ge_2Sb_2Te_5$. For example, the present inventors have carried out a study by laminating GeCrN as a diffusion preventing layer on a recording layer with respect to each of an optical recording medium wherein a composition in the vicinity of eutectic $Sb_{0.7}Te_{0.3}$ was used for the recording layer, and an optical recording medium wherein a composition in the vicinity of $Ge_2Sb_2Te_5$ was used for the recording layer, and changing the proportion of nitrogen of GeCrN in detail. As a result, the optical recording medium wherein the composition in the vicinity of $Ge_2Sb_2Te_5$ was used for the recording layer showed excellent storage stability in a high temperature and high humidity environment even in a case where the nitrogen content in the diffusion preventing layer was changed within a wide range. Whereas, the optical recording medium wherein the composition in the vicinity of eutectic $Sb_{0.7}Te_{0.3}$ was used for the recording layer, showed peeling between the diffusion preventing layer and the recording layer in a high temperature and high humidity environment in a range other than the range where the nitrogen proportion in the diffusion preventing layer is low. And, in the range where the nitrogen proportion was low so that no peeling was observed, it was not possible to make the rewriting cyclability to be satisfactory.

As the cause for the difference in the storage stability (the peeling property between the recording layer and the diffusion preventing layer) as between the composition comprising Sb as the main component like the composition in the vicinity of eutectic $Sb_{0.7}Te_{0.3}$, and the composition in the vicinity of $Ge_2Sb_2Te_5$, various possibilities are conceivable such as the film stress of the recording layer, the surface tension, the type of the crystal lattice, etc. As one cause, it may be mentioned that in a case where the material containing Ge as the main component, such as GeCrN, is used as the diffusion preventing layer, as compared with a recording layer material employing the composition containing Sb as the main component like the composition in the vicinity of eutectic $Sb_{0.7}Te_{0.3}$, the recording layer material employing the composition in the vicinity of $Ge_2Sb_2Te_5$ wherein Ge is contained in a larger amount in the recording layer material, will have a high affinity between the recording layer material and the material for the diffusion preventing layer.

From the foregoing, it is evident that when the composition of the recording layer is made to be a composition containing Sb as the main component like the composition in the vicinity of eutectic $Sb_{0.7}Te_{0.3}$, by constituting the diffusion preventing layer by at least two layers, it becomes possible to distinctly obtain the effects of the present invention to prevent peeling between the diffusion preventing layer and the recording layer, while maintaining rewriting cyclability. Accordingly, the composition of the recording layer is preferably one containing Sb as the main component in the present invention, although it is not particularly limited so long as it is one commonly used for a recording layer in a phase change type optical recording medium. Further, in the present invention, "the recording layer contains Sb as the main component" means that the content of Sb in the entire recording layer is at least 50 atomic %. The recording layer wherein the material containing Sb as the main component is used, also has a merit that crystallization can be carried out at a very high speed, and erasing by crystallization in a short time of an amorphous mark will be possible.

Further, the material containing Sb as the main component, contained in the recording layer, is preferably at least 60 atomic %, more preferably at least 70 atomic %, further preferably at least 80 atomic %, particularly preferably at least 90 atomic %, most preferably at least 95 atomic %, in the entire recording layer. The higher the content, the more remarkable the effect of the present invention. Even if other components such as oxygen, nitrogen, etc. are included during film formation of the recording layer, good recording characteristics can still be obtained, if such other components are within a range of from a few atomic % to 20 atomic %.

On the other hand, rather than using Sb alone, it is preferred to incorporate an additional element to accelerate formation of an amorphous state and to stabilize the amorphous state, in an amount of at least 1 atomic %, preferably at least 5 atomic %, more preferably at least 10 atomic %, in the entire recording layer. On the other hand, such an additional element is usually at most 30 atomic %.

The above additional element to accelerate the formation of an amorphous state and to increase the stability with time of the amorphous state, also has an effect to increase the crystallization temperature. As such an additional element, it is possible to employ Ge, Te, In, Ga, Sn, Pb, Si, Ag, Cu, Au, a rare earth element, Ta, Nb, V, Hf, Zr, W, Mo, Cu, Cr, Co, nitrogen, oxygen and Se. Among these additional elements, at least one selected from the group consisting of Ge, Te, In, Ga and Sn, is preferred with a view to accelerating formation of an amorphous state, improving the stability with time of the amorphous state and increasing the crystallization temperature. Particularly preferred is to employ Ge and/or Te, or to employ at least one of In, Ga and Sn.

To realize high densification and high speed recording, it is particularly preferred to use Sb and Ge and/or Te in combination, as the material for the recording layer. At the time of adding Ge and/or Te to Sb, the total content of Ge and/or Te is usually at least 1 atomic %, preferably at least 3 atomic %, more preferably at least 5 atomic %, and on the other hand, the total content is preferably at most 40 atomic %, more preferably at most 35 atomic %, further preferably at most 30 atomic %, particularly preferably at most 20 atomic %, most preferably at most 15 atomic %. If the total amount is less than the above range, the effect to stabilize the amorphous mark may become inadequate, and if Ge and/or Te exceeds the above range, the amorphous state tends to be too stable, whereby crystallization inversely tends to be too slow.

The composition containing Sb as the main component may be classified into two types depending upon the amount of Te contained in the recording layer. One is a composition containing at least 10 atomic % of Te, and the other is a composition containing less than 10 atomic % of Te (inclusive of a case where no Te is contained).

One of them is to bring the material for the recording layer within a compositional range such that while it contains generally at least 10 atomic % of Te, an alloy containing Sb in excess of the $Sb_{70}Te_{30}$ eutectic composition, is the main component. Such a material for the recording layer will hereinafter be referred to as a SbTe eutectic system. Here, Sb/Te is preferably at least 3, more preferably at least 4.

The other composition containing Sb as the main component, which can be classified depending upon the amount of Te contained in the recording layer, may, for example, be the following one. Namely, the composition of the recording layer is made such that while Sb is the main component, Te is made less than 10 atomic %, and Ge is incorporated as an essential component. As a specific example of such a composition for the recording layer, an alloy containing a eutectic alloy having a composition in the vicinity of $Sb_{90}Ge_{10}$, as the main component, and containing Te in an amount of less than 10 atomic % (in this specification, such an alloy will be referred to as a SbGe eutectic system) may be mentioned as preferred.

The composition wherein the amount of Te is less than 10 atomic %, is not a SbTe eutectic system and tends to have a nature as a SbGe eutectic system. With such a SbGe eutectic alloy, even if the Ge content is as high as 10 atomic %, the crystal grain size in a polycrystalline state after the initial crystallization is relatively fine, whereby the crystal state tends to be a single phase, and the noise is low. In the SbGe eutectic alloy, Te is added merely additionally, and will not be an essential element.

With a SbGe eutectic alloy, by making the Sb/Ge ratio to be relatively high, the crystallization speed can be increased, whereby recrystallization of an amorphous mark by such recrystallization will be possible.

In a case where a composition containing Sb as the main component is used for the recording layer, and recording is carried out by forming an amorphous mark, while the crystalline state is non-recorded/erased state, it becomes very important to improve the cooling efficiency, for the following reason.

Namely, with the recording layer containing Sb as the main component, such as the above-mentioned SbTe eutectic system or SbGe eutectic system, in order to meet with high speed recording, Sb is added excessively beyond the vicinity of the $Sb_{70}Te_{30}$ eutectic point or the $Sb_{90}Ge_{10}$ eutectic point to increase the crystallization speed by increasing the crystal growth rate rather than the crystal nuclei forming rate. Accordingly, in such a recording layer, it is preferred to increase the cooling rate of the recording layer to suppress a change of an amorphous mark (an amorphous mark becomes smaller than the desired size) by recrystallization. Thus, it becomes important to quench the recording layer in order to certainly form an amorphous mark after melting the recording layer, and it becomes very important to improve the cooling efficiency of the recording layer. For this purpose, in the composition for the recording layer, it is particularly preferred to employ Ag or an Ag alloy having a high heat dissipation property for the reflective layer.

In the present invention, it is particularly preferred that the above-mentioned recording layer employing a composition containing Sb as the main component, such as the SbTe eutectic system or the SbGe eutectic system, further contains at least one of In, Ga and Sn, and the content of each of In, Ga and Sn in the recording layer is at least 1 atomic % and at most 30 atomic %.

Now, specific examples of the composition containing Sb as the main component, will be further described.

Eutectic Alloy Having a Composition in the Vicinity of $Sb_{0.7}Te_{0.3}$

The composition in the vicinity of eutectic $Sb_{0.7}Te_{0.3}$ of $Sb_2Te_3$—Sb is very effective to obtain an optical recording medium for high densification and high speed recording, but it tends to be remarkable that the balance of rewriting cyclability and the storage stability of the optical recording medium can not be taken at a high level. Accordingly, the effect of the present invention wherein the diffusion preventing layer is divided into two layers to separate the functions, will be remarkable in the case of employing a recording layer containing, as the main component, the composition in the vicinity of eutectic $Sb_{0.7}Te_{0.3}$ of $Sb_2Te_3$—Sb.

The composition in the vicinity of $Sb_{0.7}Te_{0.3}$ may, for example, be a composition of $(Sb_xTe_{1-x})_{1-y}M_y$ (wherein $0.6 \leq x \leq 0.9$, $0.5 \leq 1-y \leq 1$, and M is at least one element selected from Ge, Ag, In, Ga, Zn, Sn, Si, Cu, Au, Pd, Pt, Pb, Cr, Co, N, O, S, Se, V, Nb, a rare earth element, Zr, Hf and Ta). A recording layer composed mainly of this composition is stable either in a crystalline state or in an amorphous state and is capable of phase change at a high speed between the two states.

In the above $(Sb_xTe_{1-x})_{1-y}M_y$ composition, M is particularly preferably Ge, In, Ga or Sn, most preferably Ge, from the viewpoint of the recording characteristics such as overwriting characteristics.

In the above $(Sb_xTe_{1-x})_{1-y}M_y$ composition, x is usually at least 0.6, preferably at least 0.7, more preferably at least 0.75 and on the other hand, it is usually at most 0.9. Further, 1-y is usually at least 0.5, preferably at least 0.7, more preferably at least 0.8, particularly preferably at least 0.9, and on the other hand, it is usually at most 1, preferably at most 0.99, more preferably at most 0.97. When x and y are within the above ranges, it is possible to obtain a recording layer which will meet with the requirements for high speed recording.

In the above $(Sb_xTe_{1-x})_{1-y}M_y$ composition, the composition wherein M is Ge will be further described. As such a composition, it is preferred to employ a composition represented by $Ge_y(Sb_xTe_{1-x})_{1-y}$ (wherein $0.01 \leq y \leq 0.06$, and $0.82 \leq x \leq 0.9$), which has, as a matrix, an $Sb_{70}Te_{30}$ alloy which is based on a $Sb_{70}Te_{30}$ eutectic composition and contains substantially excessive Sb, and which further contains Ge. The amount of Ge is preferably at least 0.01, particularly preferably at least 0.02, as the value of y in $Ge_y(Sb_xTe_{1-x})_{1-y}$. On the other hand, with a SbTe eutectic composition having such a large content of Sb, if the amount of Ge is too much, an intermetallic compound of GeTe or GeSbTe type will precipitate, and a SbGe alloy will also precipitate, and it is assumed that in the recording layer, crystal grains having different optical constants are present as mixed. And, by the presence of such crystal grains as mixed, a noise of the recording layer may increase, and jitter may increase. Further, even if Ge is added too much, the effect for the stability with time of the amorphous mark will be saturated. Accordingly, the amount of Ge is usually at most 0.06, preferably at most 0.05, more preferably at most 0.04 as the value of y in $Ge_y(Sb_xTe_{1-x})_{1-y}$.

In the above GeSbTe eutectic composition, it is particularly preferred to incorporate In, Ga or Sn. Namely, it is particularly preferred to employ a composition represented by $M1_zGe_y(Sb_xTe_{1-x})_{1-y-z}$ (wherein $0.01 \leq z \leq 0.4$, $0.01 \leq y \leq 0.06$, $0.82 \leq x \leq 0.9$, and M1 is at least one element selected from the group consisting of In, Ga and Sn). By adding at least one member selected from a group of elements represented by M1=Ga, In and Sn, the characteristics will be further improved. An element such as In, Ga or Sn is capable of increasing the optical contrast between the crystalline state and the amorphous state and also has an effect to reduce the jitter. Here, z representing the content of M1, is usually at least 0.01, preferably at least 0.02, more preferably at least 0.05, and on the other hand, it is usually at most 0.4, preferably at most 0.3, more preferably at most 0.2, particularly preferably at most 0.1. Within such a range, the above-mentioned effect for improving the characteristics will be satisfactorily obtained. In the above-mentioned GeSbTe eutectic composition, elements which may be incorporated in addition to In, Ga and Sn, may be nitrogen, oxygen and sulfur. These elements are effective to prevent segregation during repeated overwriting or to carry out fine adjustment of optical characteristics. The content of nitrogen, oxygen and sulfur is more preferably at most 5 atomic %, based on the total amount of Sb, Te and Ge.

Further, Cu, Zr, Hf, V, Nb, Ta, Cr or Co may be incorporated to the above GeSbTe eutectic composition. Such an element is effective as added in a very small amount to increase the crystallization temperature and to further improve the stability with time, without decreasing the crystal growth rate. However, if the amount of such an element is too much, segregation with time of a certain substance or segregation by repeated overwriting is likely to take place. Accordingly, the amount is preferably at most 5 atomic %, particularly preferably at most 3 atomic %. If segregation takes place, the recrystallization rate or the stability of the amorphous state which the recording layer initially has, may change and the overwriting characteristics may deteriorate.

Eutectic Alloy Having a Composition in the Vicinity of $Ge_{10}Sb_{90}$

Another preferred composition of the material for the recording layer wherein Sb is the main component and Ge and/or Te is used in combination, is preferably another type of an alloy containing Sb as the main component, wherein Te is less than 10 atomic % in the entire recording layer (inclusive of a case where no Te is contained), and Ge is contained as an essential component. Namely, it is a material which can be regarded as an alloy wherein an eutectic alloy having a composition in the vicinity of $Ge_{10}Sb_{90}$, is the main component (i.e. a SbGe type eutectic alloy). By a study made by the present inventors, it has been found that with the SbTe type eutectic alloy, high speed crystallization is possible, and nevertheless, the amorphous mark is further stable than the above-mentioned GeSbTe eutectic system. Further, it has been also found to have characteristics such that it is free from an increase of the noise which is observed when the Sb/Te ratio is increased with the above GeSbTe eutectic system, whereby recording with a low noise will be possible. In a case where such a SbGe type eutectic alloy is made to be the main component, the content of Ge is preferably at least 3 atomic % and at most 30 atomic %, in the entire recording layer.

More preferably, a three element alloy of InGeSb, GaGeSb or SnGeSb type having In, Ga or Sn added, is employed as the main component. In, Ga and Sn have remarkable effects to increase the difference in optical characteristics between the crystalline state and the amorphous state, than the SbGe type eutectic alloy, and they are particularly effective to obtain a high modulation as an optical recording medium.

As a preferred composition of such a SbGe type eutectic alloy, $Te_\gamma M2_\delta(Ge_\epsilon Sb_{1-\epsilon})_{1-\delta-\gamma}$ (wherein $0.01 \leq \epsilon \leq 0.3$, $0 \leq \delta \leq 0.3$, $0 \leq \gamma \leq 0.1$, $2 \leq \delta/\gamma$, $0 < \delta+\gamma \leq 0.4$, and M2 is at least one element selected from the group consisting of In, Ga and Sn) may be mentioned. By the addition of In, Ga or Sn to the SbGe type eutectic alloy, it is possible to make remarkable the effect to increase the difference in optical characteristics between the crystalline state and the amorphous state.

By using In or Ga as element M2, the jitter in ultrahigh speed recording will be improved, and the optical contrast (the difference in reflectance between the crystalline state and the amorphous state) can be increased. For this purpose, δ representing the content of In and/or Ga is usually at least 0, preferably at least 0.01, more preferably at least 0.05. However, if In or Ga is too much, separately from the crystal phase to be used as the erased state, another crystal phase of a In—Sb or Ga—Sb type having a very low reflectance may sometimes be formed. Accordingly, δ is usually at most 0.3, preferably at most 0.2. Further, when In and Ga are compared, In is preferred, since it can realize a lower jitter, and the above M2 is preferably In.

On the other hand, by using Sn as element M2, the jitter in ultrahigh speed recording can be reduced, and the optical contrast (the difference in reflectance between the crystalline state and the amorphous state) can be made larger. For this purpose, δ representing the content of Sn is usually at least 0, preferably at least 0.01, more preferably at least 0.05. However, if Sn is too much, the amorphous phase immediately after recording may sometimes change to another amorphous phase having a lower reflectance. Especially when the medium is stored for a long time, such a stabilized amorphous phase tends to precipitate to lower the erased performance. Therefore, δ is usually at most 0.3, preferably at most 0.2.

As element M2, a plurality of elements among In, Ga and Sn may be employed, but it is particularly preferred to incorporate In and Sn. In a case where In and Sn are incorporated, the total content of these elements is usually at least 1 atomic %, preferably at least 5 atomic % and usually at most 40 atomic %, preferably at most 30 atomic %, more preferably at most 25 atomic %.

With the above TeM2GeSb type composition, as it contains Te, it is possible to reduce the change with time of the erasing ratio in ultrahigh speed recording. For this purpose, γ representing the content of Te is usually at least 0, preferably at least 0.01, particularly preferably at least 0.05. However, if Te is too much, the noise may sometimes become high. Therefore, γ is usually smaller than 0.1.

Further, in the above TeM2GeSb type composition, when Te and element M2 are incorporated, it is effective to control the total content thereof. Accordingly, δ+γ representing the content of Te and element M2 is usually larger than 0, preferably at least 0.01, more preferably at least 0.05. By adjusting δ+γ within the above range, the effect of incorporating Te and element M2 simultaneously will be provided satisfactorily. On the other hand, in order to have the effect of containing the GeSb type eutectic alloy as the main component provided satisfactorily, δ+γ is usually at most 0.4, preferably at most 0.35, more preferably at most 0.3. On the other hand, δ/γ representing the atomicity ratio of element M2 to Te, is preferably at least 2. By incorporating Te, the optical contrast tends to decrease. Accordingly, in a case where Te is to be incorporated, it is preferred to slightly increase the content of element M2 (i.e. slightly increase δ).

Elements which may be added to the above TeM2GeSb type composition may, for example, be Au, Ag, Pd, Pt, Si, Pb, Bi, Ta, Nb, V, Mo, a rare earth element, N and O, and they are used for e.g. fine adjustment of the optical characteristics or the crystallization speed. The amount of their addition is about 10 atomic % at the maximum.

In the foregoing, one of the most preferred compositions is a composition containing as the main component an alloy system of $In_p Sn_q Te_r Ge_s Sb_t$ (wherein $0 \leq p \leq 0.3$, $0 \leq q \leq 0.3$, $0 < p+q \leq 0.3$, $0 \leq r < 0.1$, $0 < s \leq 0.2$, $0.5 \leq t \leq 0.9$ and $p+q+r+s+t=1$). In a case where Te and In and/or Sn are used in combination, preferred is $(p+q)/r \geq 2$.

The thickness of the recording layer 3 is preferably at least 5 nm in order to obtain a sufficient optical contrast or to increase the crystallization speed to accomplish erasing of a record in a short time. Further, in order to increase the reflectance to be sufficiently high, the thickness is more preferably at least 10 nm.

On the other hand, in order to suppress cracking and to obtain a sufficient optical contrast, the thickness of the recording layer is preferably at most 100 nm. More preferably, it is at most 50 nm, in order to reduce the thermal capacity and to increase the recording sensitivity. Further, it is also possible to reduce the volume change due to a phase change and to minimize the influence of the repeated volume change due to repetitive rewriting, over the recording layer itself or over the upper and lower protective layers. Further, accumulation of irreversible microscopic deformation can be suppressed, whereby the noise will be reduced, and the repetitive rewriting durability will be improved.

For a high density recording medium, the requirement against the noise is further severe. Accordingly, the thickness of the recording layer is made more preferably at most 30 nm.

The above recording layer 3 is, in many cases, obtained by sputtering an alloy target in an inert gas, particularly Ar gas. Further, the thicknesses of the recording layer and the protective layers are selected so that the absorption efficiency of a laser beam is excellent, and the amplitude of the record signal, i.e. the contrast between the recorded state and the non-recorded state, becomes large, in consideration of the interference effect due to a multilayered construction in addition to the restriction from the viewpoint the above-mentioned mechanical strength and reliability.

(5) Reflective Layer 5

For the reflective layer 5 in FIGS. 3(a) to (d), in addition to Ag or an Ag alloy, various materials such as Al, Au or alloys containing them as the main components, may be employed.

As the material for the reflective layer, it is preferred to employ an alloy containing Ag or Al as the main component, which has a high thermal conductivity and a large heat dissipation effect.

The content of Ag or Al in the reflective layer containing Ag or Al as the main component, is usually at least 50 atomic %, preferably at least 80 atomic %, more preferably at least 90 atomic %, particularly preferably at least 95 atomic %. In the reflective layer containing Ag as the main component, it is possible to increase the thermal conductivity of the reflective layer by increasing the content of Ag. Accordingly, in order to further increase the thermal conductivity, only Ag (pure silver) may be employed for the reflective layer.

If the material for the reflective layer suitable for the present invention is more specifically described, pure Ag, or an Ag alloy which contains, in addition to Ag, at least one element selected from the group consisting of Ti, V, Ta, Nb, W, Co, Cr, Si, Ge, Sn, Sc, Hf, Pd, Rh, Au, Pt, Mg, Zr, Mo, Cu, Nd and Mn, may be mentioned. In a case where the stability with time is more important, the additive component is preferably Ti, Mg, Au, Cu, Nd or Pd.

Further, another preferred example of the material for the reflective layer may be an Al alloy containing, in addition to Al, at least one element selected from the group consisting of Ta, Ti, Co, Cr, Si, Sc, Hf, Pd, Pt, Mg, Zr, Mo and Mn. With such an alloy, it is known that the Hirock resistance will be improved, and it can be used in consideration of the durability, the volume resistivity, the film forming speed, etc.

The amount of such other elements to be incorporated to Ag or Al is usually at least 0.1 atomic %, preferably at least 0.2 atomic %. With respect to the Al alloy, if the content of such elements is too little, the Hirock resistance tends to be inadequate in many cases, although such depends also on the film-forming condition. On the other hand, the content of such elements is usually at most 5 atomic %, preferably at most 2 atomic %, more preferably at most 1 atomic %. If the amount is too much, the resistivity of the reflective layer may sometimes become high (the thermal conductivity may sometimes decrease).

In a case where an Al alloy is to be employed, it is possible to employ an Al alloy containing from 0 to 2 wt % of Si, from 0.5 to 2 wt % of Mg and from 0 to 0.2 wt % of Ti. Si is effective to suppress fine peeling defects, but if the content is too much, the thermal conductivity may change with time. Therefore, it is usually at most 2 wt %, preferably at most 1.5 wt %. Further, Mg improves the corrosion resistance of the reflective layer, but if the content is too much, the thermal conductivity may change with time. Accordingly, it is usually at most 2 wt %, preferably at most 1.5 wt %. Ti is effective to prevent fluctuation of the sputtering rate, but if the content is too much, the thermal conductivity will be lowered, and it tends to be difficult to cast a bulk in which Ti is microscopically uniformly solid-solubilized, and the target cost will be increased. Therefore, it is usually at most 0.2 wt %.

The thickness of the reflective layer is usually at least 40 nm, preferably at least 50 nm, and on the other hand, it is usually at most 300 nm, preferably at most 200 nm. If it is too thick, not only no adequate heat dissipation effect can be obtained, but also the recording sensitivity tends to deteriorate, although the sheet resistivity may be lowered. It is considered that with a thick film, the thermal capacity per unit area will increase, and heat dissipation of itself will take time, whereby the heat dissipation effect rather tends to be small. Further, with such a thick film, it takes time for film formation, and also the material cost tends to increase. On the other hand, if the film thickness is too thin, an influence of an island structure at the initial stage of the film growth is likely to partially observed, whereby the reflectance or the thermal conductivity may decrease.

The reflective layer is usually formed by a sputtering method or a vacuum vapor deposition method. The total amount of impurities is preferably less than 2 atomic % including the amount of impurities of the target or the vapor deposition material itself, and the amount of moisture or oxygen included during the film forming. Accordingly, in a case where the reflective layer is formed by sputtering, the ultimate vacuum degree of the process chamber is preferably less than $1 \times 10^{-3}$ Pa. Further, in a case where film forming is carried out under an ultimate vacuum degree poorer than $10^{-4}$ Pa, it is advisable to adjust the film forming rate to be at least 1 nm/sec, preferably at least 10 nm/sec, thereby to prevent inclusion of impurities. Or, in a case where an intentional additive element is incorporated more than 1 atomic %, it is advisable to adjust the film forming rate to be at least 10 nm/sec thereby to minimize inclusion of additional impurities.

It is also effective to have the reflective layer multi-layered in order to secure high thermal conductivity and high reliability. In such a case, it is preferred that at least one layer is made of a material containing the above Ag or Al having a thickness of at least 50% of the total thickness of the reflective layer. This layer substantially serves to provide the heat dissipation effect, and other layer is constructed to contribute to the corrosion resistance, adhesion with the protective layer and improvement of the Hirock resistance.

(6) Light Transmitting Layer 9

The light transmitting layer 9 in FIGS. 3(a) to (d) is required to protect the sputtered film from moisture or dust and at the same time to serve as a thin incident substrate.

Accordingly, it is desired to be transparent to a laser beam to be used for recording and retrieving, and at the same time, its thickness is preferably from 50 μm to 150 μm, and it preferably realizes a uniform thickness distribution of within 5 μm in the optical recording medium.

The light transmitting layer 9 is usually formed by a method wherein an uncured photocurable resin is coated by a spin coating method, followed by curing by irradiation with light, or a method of bonding a transparent sheet. As the photocurable resin, an ultraviolet curable resin of an acrylate type is preferred, which is excellent from the viewpoint of the stability, water resistance, curing property or low shrinkage during the curing. On the other hand, as the transparent sheet, it is preferred to employ one made of a polycarbonate, which is excellent from the viewpoint of the transparency, flatness or price.

(7) Under Layer 12

FIG. 3(b) is one having an under layer 12 formed between the substrate 1 and the reflective layer 5 in the structure shown in FIG. 3(a).

The under layer 12 has an effect to suppress peeling between the substrate 1 and the metal reflective layer 5, whereby it will be possible to obtain a medium having excellent storage stability. Accordingly, it is preferred to form the under layer 12 between the substrate and the reflective layer. As mentioned above, the under layer 12 is formed for the purpose of suppressing peeling at the interface between the substrate 1 and the reflective layer 5 resulting at the time of the temperature change. Accordingly, its material is not particularly limited so long as it satisfies such an object. However, it is preferably one which has excellent adhesion to the substrate and the reflective layer, will not corrode the reflective layer, will not diffuse in the reflective layer and is excellent in flatness of the formed film surface. So long as such conditions can be satisfied, it may be optionally selected for use from single substances or mixtures of a metal, a semiconductor, a metal oxide, a metal nitride, a metal carbide, a semiconductor oxide, a semiconductor nitride, a semiconductor carbonate, a fluoride, an amorphous carbon, etc.

As a metal or semiconductor which satisfies the above condition, at least one element selected from the group consisting of Si, Ti, Cr, Ta, Nb, Pd, Ni, Co, Mo and W may, for example, be mentioned. Among them, from the viewpoint of the adhesion property and the low reactivity with the reflective layer, Cr, Ta, Nb, Ni or Mo is preferred, and it is more preferred to employ Ta, Nb or Mo. Further, as a compound, SiN, $SiO_2$, SiC, GeN, ZnO, $Al_2O_3$, $Ta_2O_5$, TaN, $Nb_2O_5$, $ZrO_2$, a rare earth element oxide, TiN, CrN, $CaF_2$ or $MgF_2$ may, for example, be mentioned. Among them, from the viewpoint of the adhesion property and the low reactivity with the reflective layer, SiN, GeN, ZnO, $Nb_2O_5$ or CrN is preferred, and it is more preferred to employ GeN or CrN. It is particularly preferred to employ GeN and CrN simultaneously.

In the foregoing, examples made of a single element or two elements are mentioned, but mixtures thereof may also be mentioned. As such a compound, a typical example employing Ge—N may be one containing Al, B, Ba, Bi, C, Ca, Ce, Cr, Dy, Eu, Ga, In, K, La, Mo, Nb, Ni, Pb, Pd, Si, Sb, Sn, Ta, Te, Ti, V, W, Yb, Zn, Zr or the like together with Ge, such as Ge—Si—N, Ge—Sb—N, Ge—Cr—N, Ge—Al—N, Ge—Mo—N or Ge—Ti—N. Among them, it is preferred to employ Ge—Cr—N.

Further, the under layer may not necessarily of a single layer structure made of a single material, and it may be a multilayer structure having a plurality of materials coated. For example, a double layered structure having a mixture of ZnS—$SiO_2$ and GeCeN on a substrate may be mentioned. With this structure, ZnS—$SiO_2$ is excellent in adhesion with the substrate, and further by the presence of GeCrN, corrosion of silver by sulfur in ZnS—$SiO_2$ can be prevented even in a case where silver or a silver alloy is employed for the reflective layer.

The under layer 12 is sufficient in a thickness which can be uniformly formed on the substrate 1, and on the contrary, if it becomes thick, not only the production cost and the production time will increase, but also a change in the groove shape of the substrate, or the like, will result. Accordingly, the thickness is preferably from 2 nm to 20 nm. Further, like other layers, the under layer is prepared by sputtering or reactive sputtering.

Further, the structure of the optical recording medium in FIGS. 3(a) to (d) is not limited to the above described structures, but may be applied to various structures, such as a structure wherein a layer made of another material may be formed between the reflective layer 5 and the protective layer 2 or the interface layer 8 as a substitute for the protective layer, or a structure wherein the reflective layer is constituted by double layers.

(B) Second Embodiment of the Present Invention

The optical recording medium in the second embodiment of the present invention is an optical recording medium comprising a reflective layer and a phase change recording layer formed in this order on a substrate, so that recording and retrieving information is carried out by applying a laser beam to the phase change recording layer from the side of the phase change recording layer opposite to the substrate side, characterized in that:

a diffusion preventing layer is formed in contact with the phase change recording layer on the side of the phase change recording layer opposite to the substrate side, a protective layer containing sulfur, is formed in contact with the diffusion preventing layer, the diffusion preventing layer comprises a non-gas element and nitrogen and/or oxygen as the main components, and the content (atomic %) of nitrogen and/or oxygen at the interface between the diffusion preventing layer and the protective layer is larger than the content (atomic %) of nitrogen and/or oxygen at the interface between the diffusion preventing layer and the phase change recording layer.

In the first embodiment, the diffusion preventing layer is divided into two layers, so that the respective diffusion preventing layers have separate functions, thereby to obtain an optical recording medium excellent in rewriting cyclability and storage stability. However, in the second embodiment, with a single diffusion preventing layer, the diffusion preventing layer is provided with a function required for the relation with the recording layer and a function required for the relation with the protective layer by changing the composition at the interface with the recording layer and the composition at the interface with the protective layer.

And, as a result of improving the adhesion at the interface between the recording layer and the diffusion preventing layer, excellent storage stability free from peeling even under a high temperature and high humidity condition, will be obtained, and mutual diffusion of constituting elements between the diffusion preventing layer and the protective layer, is suppressed, whereby good rewriting cyclability can be obtained.

Here, the interface between the diffusion preventing layer and the protective layer is a region up to 1 nm on the diffusion preventing layer side from the plane where the diffusion preventing layer is in contact with the protective layer. Further, the interface between the diffusion preventing layer and the phase change recording layer is a region up to 1 nm on the diffusion preventing layer side from the plane where the diffusion preventing layer is in contact with the recording layer.

Now, a specific example of the optical recording medium in the second embodiment of the present invention will be described with reference to the drawings. Needless to say, the present invention is not limited to the following specific example.

Figure 4:
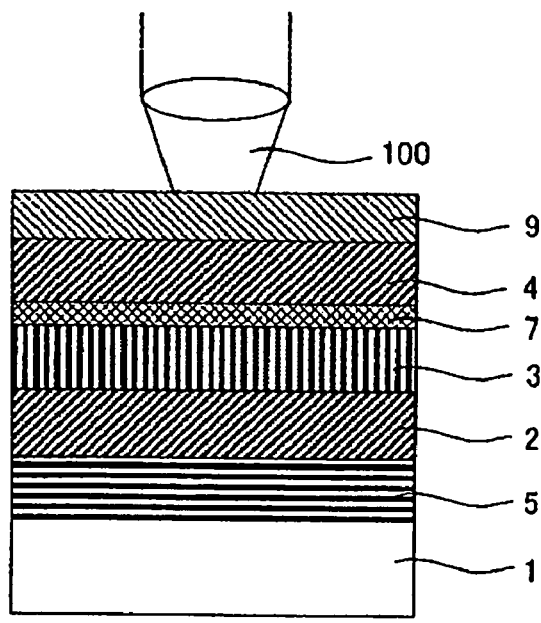
FIG. 4 is a diagrammatical cross-sectional view showing an example of the layered structure of an optical recording medium in a second embodiment of the present invention.

FIG. 4 is a diagrammatical view showing an example of the layered structure of a preferred optical recording medium in the second embodiment of the present invention. The optical recording medium in FIG. 4 comprises a reflective layer 5, a protective layer 2, a recording layer 3, a diffusion preventing layer 7, a protective layer 4 and a light transmitting layer 9 laminated in this order on a substrate 1, and a laser beam 100 to be applied to the optical recording medium from the upper side of the light transmitting layer 9.

The effects of the present invention are remarkably observed in a film side incident type optical recording medium, as explained in the above "first embodiment of the present invention". Further, the materials, thicknesses and production methods of the respective layers of the substrate 1, the reflective layer 5, the protective layer 2, the recording layer 3, the protective layer 4 and the light transmitting layer 9, in FIG. 4, are as described in the above "first embodiment of the present invention", and the same ones as in the first embodiment of the present invention may be employed.

Further, as mentioned in the above "first embodiment of the present invention", an under layer may be inserted between the substrate 1 and the reflective layer 5, or the protective layer 2 may be substituted by an interface layer 8 of a single composition.

Accordingly, only the diffusion preventing layer 7 will be described below.

The diffusion preventing layer 7 comprises a non-gas element and nitrogen and/or oxygen as the main components. Here, the non-gas element, or the material constituted by the non-gas element and nitrogen and/or oxygen, is as described in the above "first embodiment of the present invention". The total content of the non-gas element and nitrogen and/or oxygen in the diffusion preventing layer 7 is usually at least 70 atomic %, preferably at least 90 atomic %, more preferably at least 95 atomic %, most preferably at least 99 atomic %. In this manner, peeling from the recording layer can effectively be prevented, and rewriting cyclability can be improved.

In the diffusion preventing layer 7, other elements may be incorporated to such an extent not to impair the characteristics of the layer, as the case requires. In a case where other elements are incorporated, the content of such elements is preferably at most 10 atomic %, more preferably at most 5 atomic %, particularly preferably at most 1 atomic %. Further, such elements are not particularly limited, but in a case of an element having a nature of diffusing into a layer, such as sulfur, its content is preferably at most 1 atomic %.

Here, the content of nitrogen and/or oxygen at the interface between the diffusion preventing layer 7 and the recording layer 3, is usually at least 3 atomic %, preferably at least 5 atomic %, more preferably at least 10 atomic %. Within such a range, it becomes possible to reduce the optical absorption. On the other hand, the content of nitrogen and/or oxygen at the interface between the diffusion preventing layer 7 and the recording layer 3 is usually at most 50 atomic %, preferably at most 45 atomic %, more preferably at most 40 atomic %. Within such a range, it becomes possible to prevent peeling between the recording layer and the diffusion preventing layer.

Further, the content of nitrogen and/or oxygen at the interface between the diffusion preventing layer 7 and the protective layer 4 is usually at least 40 atomic %, and on the other hand, usually at most 70 atomic %, preferably at most 65 atomic %, more preferably at most 60 atomic %. Within such a range, it becomes possible to suppress the chemical reaction and diffusion of constituting atoms between the protective layer and the diffusion preventing layer.

In the present invention, the content (atomic %) of nitrogen and/or oxygen at the interface of the diffusion preventing layer 7 and the protective layer 4 is made to be larger than the content (atomic %) of nitrogen and/or oxygen at the interface between the diffusion preventing layer 7 and the recording layer 3.

In a region of the diffusion preventing layer 7 other than the interface between the diffusion preventing layer 7 and the protective layer 4 and the interface between the diffusion preventing layer 7 and the recording layer 3, the content of nitrogen and/or oxygen may be made to be constant. Further, in a region of the diffusion preventing layer 7 other than the interface between the diffusion preventing layer 7 and the protective layer 4 and the interface between the diffusion preventing layer 7 and the recording layer 3, the content of nitrogen and/or oxygen may continuously or stepwisely be changed in the thickness direction of the diffusion preventing layer. Preferred among them is that the content of nitrogen and/or oxygen is continuously or stepwisely changed in the thickness direction of the diffusion preventing layer.

The ratio in the content of the nitrogen and/or oxygen as between at the interface between the diffusion preventing layer 7 and the recording layer 3 and at the interface between the diffusion preventing layer 7 and the protective layer 4, i.e. (the content of nitrogen and/or oxygen at the interface between the diffusion preventing layer 7 and the recording layer 3)/(the content of nitrogen and/or oxygen at the interface between diffusion preventing layer 7 and the protective layer 4), is usually smaller than 1, preferably at most 0.8, more preferably at most 0.6, further preferably at most 0.5, most preferably at most 0.4. Within such a range, the balance of the storage stability and the rewriting cyclability of the optical recording medium will be good.

The analysis of the composition of the above diffusion preventing layer 7 can be made by a combination of an Auger electron spectrophotometry (AES), a Rutherford backscattering method (RBS), an induction coupling high frequency plasma photometry (ICP). And, by the above analysis of the composition, the content (atomic %) of nitrogen and/or oxygen at the interface between the diffusion preventing layer 7 and the recording layer 3, and the content (atomic %) of nitrogen and/or oxygen at the interface between the diffusion preventing layer 7 and the protective layer 4, can be obtained.

The thickness of the diffusion preventing layer is usually at least 2 nm. Within such a range, it becomes possible to suppress diffusion of sulfur even in a case where $ZnS$—$SiO_2$ which is commonly used for the protective layer, is employed. Further, if the thickness is too thin, a uniform diffusion preventing layer may not be obtained. On the other hand, the thickness of the diffusion preventing layer 7 is usually at most 10 nm, preferably at most 7 nm, more preferably at most 4 nm. Within such a range, not only it becomes possible to prevent diffusion of constituting atoms between the recording layer and the protective layer, but it becomes possible to certainly obtain a diffusion preventing layer excellent in the storage stability free from peeling by suppressing the film stress to be minimum.

The diffusion preventing layer 7 can be prepared by reactive sputtering employing a target made of a single substance of the non-gas element or a composite of the non-gas elements. At that time, the $N_2$ partial pressure or the $O_2$ partial pressure of the mixed gas of Ar, $N_2$ and/or $O_2$ circulated in the vacuum chamber may be changed between the initial stage and the last stage, but preferably continuously changed during the film forming. By changing the $N_2$ partial pressure and/or the $O_2$ partial pressure continuously, it becomes possible to change the composition (the degree of nitrification, and the oxidizing amount) of the diffusion preventing layer continuously in the thickness direction, such being preferred.

As a condition at the time of forming the diffusion preventing layer 7, for example, in the case where nitrogen is employed as the gas component in the diffusion preventing layer, the flow rate of $N_2/(Ar+N_2)$ at the time of forming the interface between the diffusion preventing layer 7 in contact with the recording layer, is usually at most 0.4, preferably at most 0.3, more preferably at most 0.2, most preferably at most 0.1. On the other hand, it is usually at least 0.01. Within such a range, the content (atomic %) of nitrogen at the interface between the recording layer and the diffusion preventing layer can be made to be the desired level. On the other hand, the flow rate of $N_2/(Ar+N_2)$ at the time of forming the interface between the diffusion preventing layer 7 in contact with the protective layer, is usually at least 0.3, preferably at least 0.4, more preferably at least 0.5. On the other hand, it is usually 0.8 or less. Within such a range, the content (atomic %) of nitrogen at the interface between the protective layer and the diffusion preventing layer can be made to be the desired level.

A specific example of such a diffusion preventing layer may, for example, be such that GeCrN is used for the diffusion preventing layer, and the proportion of the N component at the interface with the protective layer, is made larger than the proportion of the N component at the interface with the recording layer, whereby it will be possible to obtain an optical recording medium excellent in the storage stability while effectively preventing diffusion of constituting elements between the protective layer and the recording layer.

Further, the present invention is by no means restricted to the above embodiments. The above embodiments are merely exemplary, and those which have substantially the same construction and perform substantially the same effects as the technical concept disclosed in the claims of the present invention, will be all included in the technical scope of the present invention.

Now, the present invention will be described in further detail with reference to Examples, but the present invention is by no means restricted to the following Examples.

EXAMPLE 1

As an embodiment of the present invention, an optical recording medium having a structure shown in FIG. 3(*d*) was prepared.

As the substrate 1, a disk shaped polycarbonate resin having a thickness of 1.1 mm and a diameter of 120 mm was employed. For the protective layer 4, a mixture comprising $ZnS$—$SiO_2$ was employed. For the recording layer 3, an alloy comprising In—Ge—Sb—Te was employed. For the reflective layer 5, an alloy comprising Ag—Cu—Au was employed. For the interface layer 8 as a substitute for the protective layer and for the under layer 12, GeCrN was employed, and further for the first diffusion preventing layer 10 and for the second diffusion preventing layer 11, GeCrN (one having the concentration of the N component changed) was employed.

With respect to the light transmitting layer 9, 2.5 g of an uncured (non-polymerized) acrylate type ultraviolet curable agent having a viscosity of 3000 mPa·s was dropped in the vicinity of the center of the protective layer 4 and stretched by rotation at 1500 rpm for 6 seconds, and then irradiated with ultraviolet rays for curing (polymerization) to form it. During irradiation with ultraviolet rays, in order to prevent the polymerization inhibiting action by oxygen, nitrogen was purged to carry out the ultraviolet radiation at an oxygen concentration of at most 5%. The thickness of the light transmitting layer 9 was adjusted to be within a range of from 95 to 105 $\mu$m. Here, for the measurement of the film thickness, the light transmitting layer was mechanically peeled after curing of the light transmitting layer 9 and measured by means of a micrometer.

For the preparation of multilayered films other than the substrate 1 and the light transmitting layer 9, a sputtering method was employed. The film forming conditions and the film thicknesses of the respective layers were as follows.

(A) Under Layer 12
Sputtering target: $Ge_{80}Cr_{20}$ (atomic %)
Sputtering power: RF300W
Ar+$N_2$ gas pressure: 0.18 Pa
$N_2/(Ar+N_2)$ flow ratio: 0.5
Film thickness: 10 nm.
(B) Metal Reflective Layer 5
Sputtering target: $Ag_{97}Cu_1Au_2$ (atomic %)
Sputtering power: DC1000W
Ar gas pressure: 0.12 Pa
Film thickness: 100 nm.
(C) Interface Layer 8 as a Substitute for the Protective Layer
Sputtering target: $Ge_{80}Cr_{20}$ (atomic %)
Sputtering power: RF300W
Ar+$N_2$ gas pressure: 0.18 Pa
$N_2/(Ar+N_2)$ flow ratio: 0.5
Film thickness: 14 nm.
(D) Recording Layer 3
Sputtering target: $In_3Ge_5Sb_{69}Te_{23}$ (atomic %)
Sputtering power: RF300W
Ar gas pressure: 0.15 Pa
Film thickness: 12 nm.
(E) First Diffusion Preventing Layer 10
Sputtering target: $Ge_{80}Cr_{20}$ (atomic %)
Sputtering power: RF300W
Ar+$N_2$ gas pressure: 0.18 Pa
$N_2/(Ar+N_2)$ flow ratio: 0.1
Film thickness: 2 nm.
(F) Second Diffusion Preventing Layer 10
Sputtering target: $Ge_{80}Cr_{20}$ (atomic %)
Sputtering power: RF300W
Ar+$N_2$ gas pressure: 0.18 Pa
$N_2/(Ar+N_2)$ flow ratio: 0.5
Film thickness: 2 nm.
(G) Protective Layer 4
Sputtering target: $(ZnS)_{80}(SiO_2)_{20}$ (mol %)
Sputtering power: RF2000W
Ar gas pressure: 0.25 Pa
Film thickness: 42 nm.

The phase change type optical recording medium having the above structure was designated as disk 1, and further, disks 2 to 4 were prepared which had the same structure except that in disk 1, the $N_2/(Ar+N_2)$ flow ratio in the film forming conditions for the first diffusion preventing layer 10 was changed from 0.1 to 0.2, 0.3 and 0.4.

The above media were evaluated, and the results are shown in Table 1. Evaluation of the characteristics was carried out with respect to the storage stability and the rewriting cyclability. Evaluation of the storage stability was carried out by preparing five disks for each of disks 1 to 4, and observing the four directions of each disk in a radial direction at 0°, 90°, 180° and 270°, before and after the acceleration test. The acceleration test was carried out in two ways i.e. under a condition of maintaining a sample in an environment of 80° C./85% for 250 hours and under a condition of maintaining a sample in an environment of 110° C./90% for 5 hours. And, a case where peeling of at least 50 μm was not observed with respect to all of the five disks, was judged to be ⊚, a case wherein peeling of at least 50 μm was observed only in one direction with respect to one or two disks among the five disks, was judged to be ○, and a case where peeling of at least 50 μm was observed only in one direction with respect to all of the five disks, was judged to be Δ, and a case where peeling of at least 50 μm was observed in the four directions with respect to all of the five disks was judged to be X.

For the rewriting cyclability, rewriting 30,000 times and 50,000 times was carried out by using a pickup having a numerical aperture NA of 0.85 and a wavelength of 404 nm at a linear velocity of 5.7 m/s by a RLL (1, 7) signal system in a case where the shortest mark length was 0.173 μm. The record signals after rewriting 30,000 times and 50,000 times were subjected to waveform equalization by means of a waveform equalization device, and then, a value (a jitter value) obtained by dividing, by a window width T, a jitter of the difference in timing between the rising and falling of a binarized signal and the rising of a clock signal, was evaluated. And, a case where the jitter value after recording 30,000 times and 50,000 times did not exceed 7%, was judged to be ○, a case where the jitter value after recording 30,000 times did not exceed 7%, but the jitter value after recording 50,000 times exceed 7%, was judged to be Δ, and a case where the jitter value after recording 30,000 times exceeded 7%, was judged to be X.

TABLE 1

| Disk No. | First diffusion preventing layer $N_2/$ $(Ar + N_2)$ | Second diffusion preventing layer $N_2/$ $(Ar + N_2)$ | Storage stability 80° C./85% 250 hr | Storage stability 110° C./90% 5 hr | Rewriting cyclability |
|---|---|---|---|---|---|
| Disk 1 | 0.1 | 0.5 | ⊚ | ⊚ | ○ |
| Disk 2 | 0.2 | | ⊚ | ⊚ | ○ |
| Disk 3 | 0.3 | | ○ | ○ | ○ |
| Disk 4 | 0.4 | | Δ | Δ | ○ |

With all of disks 1 to 4, the jitter value after rewriting 30,000 times was good at a level of at most 7%, and with disks 1 and 2 wherein the $Ar/(Ar+N_2)$ flow ratio at the time of forming the first diffusion preventing layer was small, no peeling by an acceleration test was observed, and the storage stability was also good.

COMPARATIVE EXAMPLE 1

As a Comparative Example, a phase change type optical disk having the same structure as in Example 1 was prepared except that in FIG. 3(d) the first diffusion preventing layer 10 and the second diffusion preventing layer 11 was replaced by a single diffusion preventing layer 13 having a single composition (FIG. 2(b)). The film forming conditions and the film thickness of the diffusion preventing layer 13 were as follows.

(H) Diffusion Preventing Layer 13
Sputtering target: $Ge_{80}Cr_{20}$ (atomic %)
Sputtering power: RF300W
$Ar+N_2$ gas pressure: 0.18 Pa
$N_2/(Ar+N_2)$ flow ratio: 0.1
Film thickness: 4 nm.

The phase change type optical recording medium of the above structure was designated as disk 5, and further disks 6 to 9 having the same structure, were prepared except that the $N_2/(Ar+N_2)$ flow ratio was changed from 0.1 to 0.2, 0.3, 0.4 and 0.5.

With respect to the disks 5 to 9, evaluation was carried out with respect to the storage stability and the rewriting cyclability in the same manner as in Example 1, and the results are shown in Table 2.

TABLE 2

| Disk No. | Diffusion preventing layer $N_2/(Ar + N_2)$ | Storage stability 80° C./85% | Storage stability 110° C./90% | Rewriting cyclability |
|---|---|---|---|---|
| Disk 5 | 0.1 | ⊚ | ⊚ | X |
| Disk 6 | 0.2 | ⊚ | ⊚ | X |
| Disk 7 | 0.3 | ○ | ○ | X |
| Disk 8 | 0.4 | Δ | Δ | Δ |
| Disk 9 | 0.5 | X | X | ○ |

With media having a small $N_2/(Ar+N_2)$ flow ratio at the time of forming the diffusion preventing layer 13, the storage stability was good, but rewriting cyclability were inadequate. Inversely, with media having a large $N_2/(Ar+N_2)$ flow ratio, the rewriting cyclability were good, but the storage stability was inadequate, and there was no $N_2/(Ar+N_2)$ flow ratio, which satisfies both the storage stability and the rewriting cyclability.

From Example 1 and Comparative Example 1, the following may be mentioned.

Firstly, in order to improve the storage stability, GeCrN in contact with the recording layer is required to have a small $N_2/(Ar+N_2)$ flow ratio during its film formation i.e. required to have a small nitriding degree. However, with a diffusion preventing layer GeCrN made of a single layer, at a nitriding degree to satisfy the storage stability, it is not possible to obtain an optical recording medium which fully satisfy the rewriting cyclability. This is considered to be attributable to diffusion of constituting elements which took place between GeCrN of the diffusion preventing layer and ZnS—$SiO_2$ of the protective layer and also to further diffusion of constituting elements of the protective layer diffused to the diffusion preventing layer and further to the recoding layer and not to diffusion of constituting elements between the recording layer and the diffusion preventing layer made of GeCrN.

On the other hand, in a case where the nitriding degree is large in GeCrN of the diffusion preventing layer made of a single layer, the rewriting cyclability will be good, but it is not possible to obtain an optical recording medium which satisfies the storage stability. This is considered to be attributable to the fact that although diffusion of constituting elements between the diffusion preventing layer made of GeCrN and the protective layer made of $ZnS-SiO_2$ is suppressed, as the nitriding degree is large, the recording layer and the diffusion preventing layer are more likely to undergo peeling.

From the foregoing, it is evident that the nitriding degree, and the storage stability and the rewriting cyclability are in a mutually opposed relation, and with an optical recording medium employing a diffusion preventing layer made of a single layer, it is not possible to obtain an optical recording medium which satisfies both characteristics.

Thus, the effectiveness of the present invention has been made clear, such that the diffusion preventing layer of GeCrN is divided into two layers, so that the first diffusion preventing layer in contact with the recording layer has a small nitriding degree to improve the storage stability, while the second diffusion preventing layer in contact with the protective layer is made to have a large nitriding degree thereby to suppress diffusion of elements between the second diffusion preventing layer and the protective layer.

EXAMPLE 2

Then, the following disks 10 to 13 were prepared to make clear the effects of the thickness of the protective-layer on the incident side and of the presence or absence of the under layer in the film side incident type optical recording medium.

As disk 10, an optical recording medium of a structure having the under layer 12 removed from FIG. 3(d), was prepared. The substrate 1 and the light transmitting layer 9 were exactly the same as in Example 1. Also with respect to the protective layer 4, the reflective layer 5, the interface layer 8 as a substitute for the protective layer, the recording layer 3, the first diffusion preventing layer 10 and the second diffusion preventing layer 11, the same materials as in Example 1 were employed, and they were prepared by a sputtering method. The film forming conditions and the film thicknesses of the respective layers are as follows.

(B) Metal Reflective Layer 5
Sputtering target: $Ag_{97}Cu_1Au_2$ (atomic %)
Sputtering power: DC1000W
Ar gas pressure: 0.15 Pa
Film thickness: 100 nm.

(C) Interface Layer 8 as a Substitute for the Protective Layer
Sputtering target: $Ge_{80}Cr_{20}$ (atomic %)
Sputtering power: RF300W
Ar+$N_2$ gas pressure: 0.20 Pa
$N_2$/(Ar+$N_2$) flow ratio: 0.6
Film thickness: 14 nm.

(D) Recording Layer 3
Sputtering target: $In_3Ge_5Sb_{70}Te_{22}$ (atomic %)
Sputtering power: RF300W
Ar gas pressure: 0.18 Pa
Film thickness: 12 nm.

(E) First Diffusion Preventing Layer 10
Sputtering target: $Ge_{80}Cr_{20}$ (atomic %)
Sputtering power: RF300W
Ar+$N_2$ gas pressure: 0.20 Pa
$N_2$/(Ar+$N_2$) flow ratio: 0.1
Film thickness: 2 nm.

(F) Second Diffusion Preventing Layer 11
Sputtering target: $Ge_{80}Cr_{20}$ (atomic %)
Sputtering power: RF300W
Ar+$N_2$ gas pressure: 0.20 Pa
$N_2$/(Ar+$N_2$) flow ratio: 0.6
Film thickness: 2 nm.

(G) Protective Layer 4
Sputtering target: $(ZnS)_{80}(SiO_2)_{20}$ (mol %)
Sputtering power: RF2000W
Ar gas pressure: 0.28 Pa
Film thickness: 43 nm.

Further, disk 11 having the same structure was prepared except that in the phase change type optical disk 10 of the above structure, the thickness of the protective layer 4 was changed to 129 nm. When these optical recording media are subjected to recording and retrieving by a laser beam having a wavelength of 404 nm, if $(ZnS)_{80}(SiO_2)_{20}$ (mol %) is used for the protective layer 4, as the refractive index n is n=2.3, $\lambda/2n=88$ nm, and when the thickness of the protective layer 4 is d, in disk 10, $d<\lambda/2n$, and in disk 11, $d \geq \lambda/2n$.

Further, disk 12 having a layer made of GeCrN added as an under layer 12 in disk 11, or disk 13 having a layer made of Ta added, was prepared. The film forming conditions for each under layer 12 are as follows.

(I) Under Layer 12 in Disk 12
Sputtering target: $Ge_{80}Cr_{20}$ (atomic %)
Sputtering power: RF500W
Ar+$N_2$ gas pressure: 0.20 Pa
$N_2$/(Ar+$N_2$) flow ratio: 0.5
Film thickness: 10 nm.

(J) Under Layer 12 in Disk 13
Sputtering target: Ta (at least 99.9 atomic %)
Sputtering power: RF500W
Ar gas pressure: 0.18 Pa
Film thickness: 10 nm.

The layered structures of the foregoing disks 10 to 13 are shown in Table 3, and the results of evaluation of disks 10 to 13 are shown in Table 4. Evaluation of the characteristics were carried out with respect to the storage stability and rewriting cyclability. With respect to the evaluation of the storage stability, an acceleration test was carried out while maintaining the disk in an environment of 80° C./85% for 100 hours, whereby the error rate was measured. The measurement of the error rate was carried out with respect to the measurement of a signal recorded prior to the acceleration test (archival) and with respect to the measurement of a signal recorded after the acceleration test (shelf). Further, measurement of an error rate of archival was carried out by carrying out an acceleration test by maintaining a disk for three hours under an environment of 110° C./90%.

For the rewriting cyclability, the jitter value of a recorded signal after rewriting 10,000 times, 50,000 times and 100,000 times in the same recording conditions as in Example 1 and Comparative Example 1, was measured.

TABLE 3

| Disk No. | Under layer | Reflective layer | Protective layer | Recording layer | First diffusion preventing layer | $N_2/(Ar + N_2)$ | Second diffusion preventing layer | $N_2/(Ar + N_2)$ | Protective layer* |
|---|---|---|---|---|---|---|---|---|---|
| Disk 10 | — | AgCuAu | GeCrN | InGeSbTe | GeCrN | (0.1) | GeCrN | (0.6) | ZS43 nm |
| Disk 11 | — | Same | Same | Same | Same | Same | Same | Same | ZS129 nm |
| Disk 12 | GeCrN | Same | Same | Same | Same | Same | Same | Same | ZS129 nm |
| Disk 13 | Ta | Same | Same | Same | Same | Same | Same | Same | ZS129 nm |

*"ZS" in the protective layer represents ZnS—SiO$_2$ as the material for the protective layer.

TABLE 4

| Disk No. | Thickness of protective layer 4 | Under layer | Error rate 80° C./85% Archival | Error rate 80° C./85% Shelf | Error rate 110° C./90% Archival | Rewriting cyclability (jitter) 10,000 times | Rewriting cyclability (jitter) 50,000 times | Rewriting cyclability (jitter) 100,000 times |
|---|---|---|---|---|---|---|---|---|
| Disk 10 | $d < \lambda/2n$ | Nil | $<1.0 \times 10^{-5}$ | $4.1 \times 10^{-4}$ | $>10^{-2}$ | 6.2% | 6.3% | 6.9% |
| Disk 11 | $d \geq \lambda/2n$ | Nil | $<1.0 \times 10^{-5}$ | $<1.0 \times 10^{-5}$ | $3.1 \times 10^{-4}$ | 5.9% | 6.0% | 7.2% |
| Disk 12 | $d \geq \lambda/2n$ | GeCrN | $<1.0 \times 10^{-5}$ | $<1.0 \times 10^{-5}$ | $1.5 \times 10^{-5}$ | 5.8% | 6.0% | 6.6% |
| Disk 13 | $d \geq \lambda/2n$ | Ta | $<1.0 \times 10^{-5}$ | $<1.0 \times 10^{-5}$ | $<1.0 \times 10^{-5}$ | 5.9% | 5.9% | 6.4% |

With respect to all of disks 10 to 13, the jitter value after rewriting 100,000 times was good at a level of 7%.

With respect to the storage stability, the archival error rate in an acceleration test at 80° C./85% was good at a level of not more than $1.0 \times 10^{-5}$ with respect to all of disks 10 to 13. Further, the shelf error rate in an acceleration test at 80° C./85% and the archival error rate in an acceleration test at 110° C./90% were better with disks 11 to 13 than with disk 10, and further, the archival error rate in an acceleration test at 110° C./90% was better with disks 12 and 13 than with disks 10 and 11. Especially disks 12 and 13 wherein an under layer was provided, and the thickness of the protective layer 4 was more than $\lambda/2n$, were good with respect to all of the measured values.

These indicate that by increasing the thickness of the protective layer 4 on the incident side, it becomes possible to shield moisture penetrating into the optical recording medium, such being advantageous for the storage stability, and by providing the under layer, peeling between the substrate 1 and the reflective layer 5 can be prevented, such being advantageous for the storage stability.

COMPARATIVE EXAMPLE 2

Figure 5:
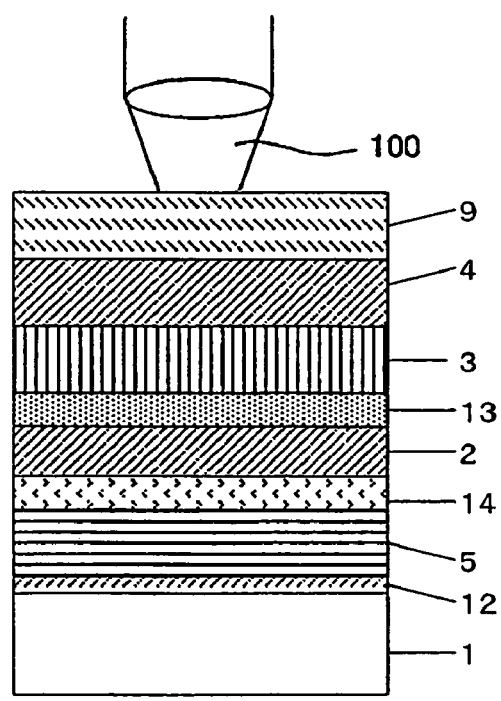
FIG. 5 is a diagrammatical cross-sectional view of an optical recording medium in Comparative Example 2.

Then, in order to make the difference clear between a case where the diffusion preventing layer is formed on the incident side of the recording layer and a case where it is formed on the substrate side of the recording layer, an optical recording medium as shown in FIG. 5, was prepared.

The structure shown in FIG. 5 is a structure wherein in the structure shown in FIG. 2(a), a diffusion preventing layer 13 made of a single layer is formed on the substrate side of the recording layer 3, and further an under layer 12 and an interface layer 14 of the reflective layer are formed. The interface layer 14 of the reflective layer was formed for the purpose of preventing diffusion of constituting elements between the protective layer 2 and the reflective layer 5. The substrate 1 and the light transmitting layer 9 were exactly the same as in Example 1. Also with respect to the protective layer 2, the protective layer 4, the recording layer 3, the reflective layer 5 and the under layer 12, the same materials as in Example 1 were employed, and they were prepared by a sputtering method. The film forming conditions and the film thicknesses of the respective layers are as follows.

(A) Under Layer 12
Sputtering target: Ge$_{80}$Cr$_{20}$ (atomic %)
Sputtering power: RF300W Ar+N$_2$ gas pressure: 0.18 Pa
N$_2$/(Ar+N$_2$) flow ratio: 0.5
Film thickness: 10 nm.
(B) Metal Reflective Layer 5
Sputtering target: Ag$_{97}$Cu$_1$Au$_2$ (atomic %)
Sputtering power: DC1000W
Ar gas pressure: 0.12 Pa
Film thickness: 100 nm.
(C) Interface Layer 14 of the Reflective Layer
Sputtering target: Ge$_{80}$Cr$_{20}$ (atomic %)
Sputtering power: RF300W
Ar+N$_2$ gas pressure: 0.18 Pa
N$_2$/(Ar+N$_2$) flow ratio: 0.5
Film thickness: 3 nm.
(D) Protective Layer 2
Sputtering target: (ZnS)$_{80}$ (SiO$_2$)$_{20}$ (mol %)
Sputtering power: RF2000W
Ar gas pressure: 0.25 Pa
Film thickness: 5 nm.
(E) Diffusion Preventing Layer 13
Sputtering target: Ge$_{80}$Cr$_{20}$ (atomic %)
Sputtering power: RF300W
Ar+N$_2$ gas pressure: 0.18 Pa
N$_2$/(Ar+N$_2$) flow ratio: 0.1
Film thickness: 4 nm.
(D) Recording Layer 3
Sputtering target: In$_3$Ge$_5$Sb$_{69}$Te$_{23}$ (atomic %)
Sputtering power: RF300W Ar gas pressure: 0.15 Pa
Film thickness: 12 nm.
(G) Protective Layer 4
Sputtering target: (ZnS)$_{80}$ (SiO$_2$)$_{20}$ (mol %)
Sputtering power: RF2000W
Ar gas pressure: 0.25 Pa
Film thickness: 40 nm.

The above optical recording medium was designated as disk 14, and further, disks 15 to 18 were prepared which had the same structure except that in disk 14, the N$_2$/(Ar+N$_2$) flow ratio in the film forming conditions for the diffusion preventing layer 13 was changed from 0.1 to 0.2, 0.3, 0.4 and 0.5.

With respect to the above disks 14 to 18, evaluation of the storage stability and the rewriting cyclability was carried out in the same manner as in Example 1 and Comparative Example 1. However, with respect to the storage stability, the environment condition was 80° C./85% only, and the retention time was 300 hours. The evaluation results are shown in Table 5.

As shown in Table 5, with respect to all of disks 14 to 18, the storage stability was good, and on the other hand, the rewriting cyclability were inadequate. With respect to the rewriting cyclability, after rewriting 5,000 times, the signal amplitude became very small and could not be measured.

TABLE 5

| Disk No. | Diffusion preventing layer | Storage stability | Rewriting cyclability |
|---|---|---|---|
| Disk 14 | 0.1 | ⊚ | X |
| Disk 15 | 0.2 | ⊚ | X |
| Disk 16 | 0.3 | ⊚ | X |
| Disk 17 | 0.4 | ⊚ | X |
| Disk 18 | 0.5 | ⊚ | X |

From this Comparative Example, the following may be mentioned.

Firstly, with respect to the storage stability, in a case where in a layer side incident type optical recording medium, a diffusion preventing layer is to be formed on the substrate side of the recording layer opposite to the incident side, the recording layer will be formed after forming the diffusion preventing layer. In such a case, a vacuum evacuation step is included before formation of the recording layer, and an excess gas component (such as nitrogen or oxygen) on the diffusion preventing layer will be evacuated, and there will be no residual gas at the interface between the diffusion preventing layer and the recording layer, thus showing excellent whether resistance.

Further, with respect to the rewriting cyclability, with a film side incident type optical recording medium, even if a diffusion preventing layer is formed only on the substrate side of the recording layer opposite to the incident side, the rewriting cyclability will not be improved. Namely, the protective layer located on the substrate side of the recording layer is close to the reflective layer, whereby the temperature rise is not remarkable due to the heat dissipation effect of the reflective layer, while in the protective layer located on the incident side of the recording layer, heat dissipation is inadequate, whereby the temperature rise becomes remarkable, and mutual diffusion of constituting atoms between the recording layer and the protective layer on the incident side will be the main factor for the deterioration of the rewriting cyclability.

Accordingly, it can be said that the method of dividing the diffusion preventing layer into multilayers or the method of continuously changing the continuous gas element content to change the content of the gas element as between the recording layer interface and the protective layer interface, will be effective for the first time when it is employed for the incident side of a film side incident type optical recording medium.

INDUSTRIAL APPLICABILITY

According to the present invention, it is possible to obtain a film side incident type optical recording medium which simultaneously satisfies the storage stability and the repetitive recording characteristics at a higher level than ever. Particularly, it is possible to obtain a film-side incident type optical recording medium excellent in the rewriting cyclability and the storage stability when held under a high temperature and high humidity condition.

According to the present invention, by separating the functions of the diffusion preventing layer formed between the recording layer and the protective layer located on the light incident side, as between the side in contact with the recording layer and the side in contact with the protective layer, it becomes possible that the storage stability and the rewriting cyclability of the optical recording medium can be satisfied at a very high level in good balance.

In the foregoing, the present invention has been described with reference to specific embodiments, but it is apparent to those skilled in the art that various changes and modifications are possible without departing from the scope and the intent of the present invention.

Further, this application is based on a Japanese Application (JP2002-289643) filed on Oct. 2, 2002, and a Japanese Application (JP2003-120125) filed on Apr. 24, 2003, the entirety of which is included by reference.

What is claimed is:

1. An optical recording medium comprising a reflective layer and a phase change recording layer formed in this order on a substrate, so that recording and retrieving information is carried out by applying a laser beam to the phase change recording layer from the side of the phase change recording layer opposite to the substrate side, characterized in that:
    a diffusion preventing layer is formed in contact with the phase change recording layer on the side of the phase change recording layer opposite to the substrate side,
    a protective layer containing sulfur, is formed in contact with the diffusion preventing layer,
    the diffusion preventing layer is constituted by at least two layers, which comprise a non-gas element and nitrogen and/or oxygen as the main components, and
    when among at least two layers constituting the diffusion preventing layer, the layer in contact with the phase change recording layer is designated as a first diffusion preventing layer, and the layer in contact with the protective layer is designated as a second diffusion preventing layer,
    the amount (atomic %) of nitrogen and/or oxygen contained in the second diffusion preventing layer is larger than the amount (atomic %) of nitrogen and/or oxygen contained in the first diffusion preventing layer.

2. The optical recording medium according to claim 1, wherein the diffusion preventing layer is constituted by two layers of the first diffusion preventing layer and the second diffusion preventing layer.

3. The optical recording medium according to claim 1, wherein the non-gas element contained in each of the first diffusion preventing layer and the second diffusion preventing layer, is the same.

4. The optical recording medium according to claim 1, wherein the thickness of each of the first diffusion preventing layer and the second diffusion preventing layer, is at least 1 nm.

5. An optical recording medium comprising a reflective layer and a phase change recording layer formed in this order on a substrate, so that recording and retrieving information is carried out by applying a laser beam to the phase change recording layer from the side of the phase change recording layer opposite to the substrate side, characterized in that:
   a diffusion preventing layer is formed in contact with the phase change recording layer on the side of the phase change recording layer opposite to the substrate side,
   a protective layer containing sulfur, is formed in contact with the diffusion preventing layer,
   the diffusion preventing layer comprises a non-gas element and nitrogen and/or oxygen as the main components, and
   the content (atomic %) of nitrogen and/or oxygen at the interface between the diffusion preventing layer and the protective layer is larger than the content (atomic %) of nitrogen and/or oxygen at the interface between the diffusion preventing layer and the phase change recording layer.

6. The optical recording medium according to claim 5, wherein the thickness of the diffusion preventing layer is at least 2 nm.

7. The optical recording medium according to claim 1 or 5, wherein the non-gas element is at least one selected from the group consisting of Si, Ge, Al, Ti, Ta, Cr, Mo, Sb, Sn, Nb, Y, Zr and Hf.

8. The optical recording medium according to claim 7, wherein the non-gas element is at least one selected from the group consisting of Si, Ge, Al and Cr.

9. The optical recording medium according to claim 1, wherein each of the first diffusion preventing layer and the second diffusion preventing layer contains Ge, Cr and N, and the content (atomic %) of N contained in the second diffusion preventing layer is larger than the content (atomic %) of N contained in the first diffusion preventing layer, and a protective layer containing ZnS is formed in contact with the second diffusion preventing layer.

10. The optical recording medium according to claim 1 or 5, wherein the phase change recording layer contains Sb as the main component.

11. The optical recording medium according to claim 10, wherein the phase change recording layer further contains Ge and/or Te.

12. The optical recording medium according to claim 11, wherein the total content of Ge and/or Te is from 3 atomic % to 40 atomic %.

13. The optical recording medium according to claim 10, wherein the phase change recording layer has a composition of $(Sb_xTe_{1-x})_{1-y}M_y$ (wherein $0.6 \leq x \leq 0.9$, $0.5 \leq 1-y \leq 1$, and M is at least one element selected from Ge, Ag, In, Ga, Zn, Sn, Si, Cu, Au, Pd, Pt, Pb, Cr, Co, N, O, S, Se, V, Nb, rare earth elements, Zr, Hf and Ta).

14. The optical recording medium according to claim 13, wherein M is at least one of Ge, Ag and In.

15. The optical recording medium according to claim 10, wherein the phase change recording layer has a composition of $Te_\gamma M2_\delta(Ge_\epsilon Sb_{1-\epsilon})_{1-\delta-\gamma}$ (wherein $0.01 \leq \epsilon \leq 0.3$, $0 \leq \delta \leq 0.3$, $0 \leq \gamma \leq 0.1$, $2 \leq \delta/\gamma$, $0 < \delta+\gamma \leq 0.4$, and M2 is at least one element selected from the group consisting of In, Ga and Sn).

16. The optical recording medium according to claim 1 or 5, wherein an under layer is formed between the substrate and the reflective layer.

17. The optical recording medium according to claim 16, wherein the under layer contains at least one element selected from the group consisting of Si, Ti, Cr, Ta, Nb, Pd, Ni, Co, Mo and W.

18. The optical recording medium according to claim 16, wherein the under layer contains at least one compound selected from the group consisting of SiN, $SiO_2$, SiC, GeN, ZnO, $Al_2O_3$, $Ta_2O_5$, TaN, $Nb_2O_5$, $ZrO_2$, rare earth element oxides, TiN, CrN, $CaF_2$ and $MgF_2$.

19. The optical recording medium according to claim 18, wherein the under layer contains GeN and CrN.

20. The optical recording medium according to claim 1 or 5, wherein $d \geq \lambda/2n$ where n is the refractive index of the protective layer, d is the thickness of the protective layer and $\lambda$ is the wavelength of the recording/retrieving light.

* * * * *